US011352002B2

(12) United States Patent
Shenker et al.

(10) Patent No.: US 11,352,002 B2
(45) Date of Patent: Jun. 7, 2022

(54) AUTOMATED PEDAL SENSOR PROFILE FOR SPEED CONTROL

(71) Applicant: Imperio, LLC, Akron, OH (US)

(72) Inventors: Steven Shenker, Cape Town (ZA);
David A. Ashman, Portland, OR (US);
Chris Thompson, Akron, OH (US);
Shawn Inks, Akron, OH (US)

(73) Assignee: AYTOMIC SC LLC, Akron, OH (US)

( * ) Notice: Subject to any disclaimer, the term of this patent is extended or adjusted under 35 U.S.C. 154(b) by 320 days.

(21) Appl. No.: 16/524,917

(22) Filed: Jul. 29, 2019

(65) Prior Publication Data
US 2020/0031347 A1  Jan. 30, 2020

Related U.S. Application Data

(60) Provisional application No. 62/703,954, filed on Jul. 27, 2018.

(51) Int. Cl.
*B60W 30/14* (2006.01)
*B60W 10/06* (2006.01)

(52) U.S. Cl.
CPC .......... *B60W 30/143* (2013.01); *B60W 10/06* (2013.01); *B60W 2540/10* (2013.01)

(58) Field of Classification Search
CPC .... B60W 30/00; B60W 30/14; B60W 30/143; B60W 10/00; B60W 10/04; B60W 10/06; B60W 2540/00; B60W 2540/10
See application file for complete search history.

(56) References Cited

U.S. PATENT DOCUMENTS 4,843,555 A    6/1989  Hattori et al.
5,255,653 A *  10/1993 Ironside ............... F02D 11/105
                                               123/198 D
(Continued)

FOREIGN PATENT DOCUMENTS

DE    10 2010 063053 A1    6/2012
WO        95/27237 A1    10/1995

OTHER PUBLICATIONS

The International Search Report and The Written Opinion of the International Searching Authority, or the Declaration from corresponding PCT Application No. PCT/US2019/043931, dated Oct. 22, 2019, 17 pages.

*Primary Examiner* — Sze-Hon Kong
*Assistant Examiner* — Michael Allen Brace, Jr.
(74) *Attorney, Agent, or Firm* — Tucker Ellis LLP; Heather M. Barnes; Michael G. Craig

(57) ABSTRACT

One or more techniques and/or systems are disclosed for automatically obtaining a profile for a set of accelerator pedal position sensors in a target vehicle. The profile can comprise a correlation of the position of the pedal to an output signal for one or more sensor in the set of sensors. A pedal position sensor signal reader can be used to automatically detect signals from one or more pedal position sensor in the target vehicle's accelerator pedal, while the pedal is released, depressed, and moving between the released and depressed positions. A pedal profile can be automatically generated using the output signals and corresponding pedal positions. Obtained data can be used to program a speed control device for the target vehicle. Correlated output can be used to adjust the speed of the vehicle by sending an emulated signal to the ECM, which may adjust the speed control system.

18 Claims, 14 Drawing Sheets

(56) References Cited

U.S. PATENT DOCUMENTS

| | | | |
|---|---|---|---|
| 5,320,076 A | 6/1994 | Reppich et al. | |
| 5,321,980 A * | 6/1994 | Hering | F02D 9/02 |
| | | | 123/361 |
| 2001/0029414 A1 * | 10/2001 | Nada | F02D 41/222 |
| | | | 701/29.7 |
| 2009/0288637 A1 | 11/2009 | Hund et al. | |
| 2011/0040457 A1 * | 2/2011 | Bernhardt | F02D 41/2474 |
| | | | 701/49 |

* cited by examiner

AUTOMATED PEDAL SENSOR PROFILE FOR SPEED CONTROL

CROSS-REFERENCE TO RELATED APPLICATIONS

This application claims priority to U.S. Ser. No. 62/703,954, titled AUTOMATED PEDAL SENSOR PROFILE FOR SPEED CONTROL, filed Jul. 27, 2018, which is incorporated in its entirety herein.

BACKGROUND

Modern vehicles have an engine control module (ECM) (a.k.a engine control unit (ECU)), which typically acts as the vehicles main computer for functions relating to engine performance, vehicle speed and fuel efficiency. The ECM can be coupled with a plurality of sensors in the vehicle to receive signals relating to current and requested conditions for the vehicle; and can interpret the data according to programmed algorithms or lookup tables, and adjust the engine performance accordingly. At least one set of sensors is associated with the vehicle speed, both current speed and the speed desired by the vehicle operator. A speed sensor can detect current speed, and accelerator pedal sensors, along with throttle position sensors, can be used to regulate the vehicle's speed to a desired speed.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, systems and method for automatically obtaining a profile for a set of accelerator pedal position sensors in a target vehicle. The profile can comprise a correlation of the position of the pedal to an output signal for one or more sensor in the set of sensors. In one implementation, the obtained correlation data, comprising the sensor profile, can be used to program a speed control device for the target vehicle. As an example, desired speed input by a vehicle operator, such as from a pedal sensor, can be correlated to the appropriate sensor output using the obtained sensor profile. This correlated output can be used to adjust the speed of the vehicle by sending a desired output signal to the ECM, which may be adjusted according to some speed control system.

In one implementation, a method for automatically generating a pedal profile for a target vehicle. In this implementation, a pedal position sensor reader can be used to automatically detect an output signal from one or more pedal position sensors for an accelerator pedal in a target vehicle, when the pedal is disposed in a released position. Further, the pedal position sensor reader can be used to automatically detect an output signal from the one or more pedal position sensors for the accelerator pedal in the target vehicle, while the pedal is moving between the released position and a depressed position. Additionally, the pedal position sensor reader can be used to automatically detect an output signal from the one or more pedal position sensors for the accelerator pedal in the target vehicle, when the pedal is disposed in the depressed position. A processor can be used to automatically select a master sensor from the one or more pedal position sensors and determining a linear relationship between a position of the pedal and the plurality of output signals for the master sensor. The processor can also be used to automatically generate a pedal position profile for the accelerator pedal based on the linear relationship of the mater sensor, the pedal position profile comprising an output signal corresponding to respective pedal positions for the accelerator pedal, and store the generated pedal position profile in memory.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

Figure 1:
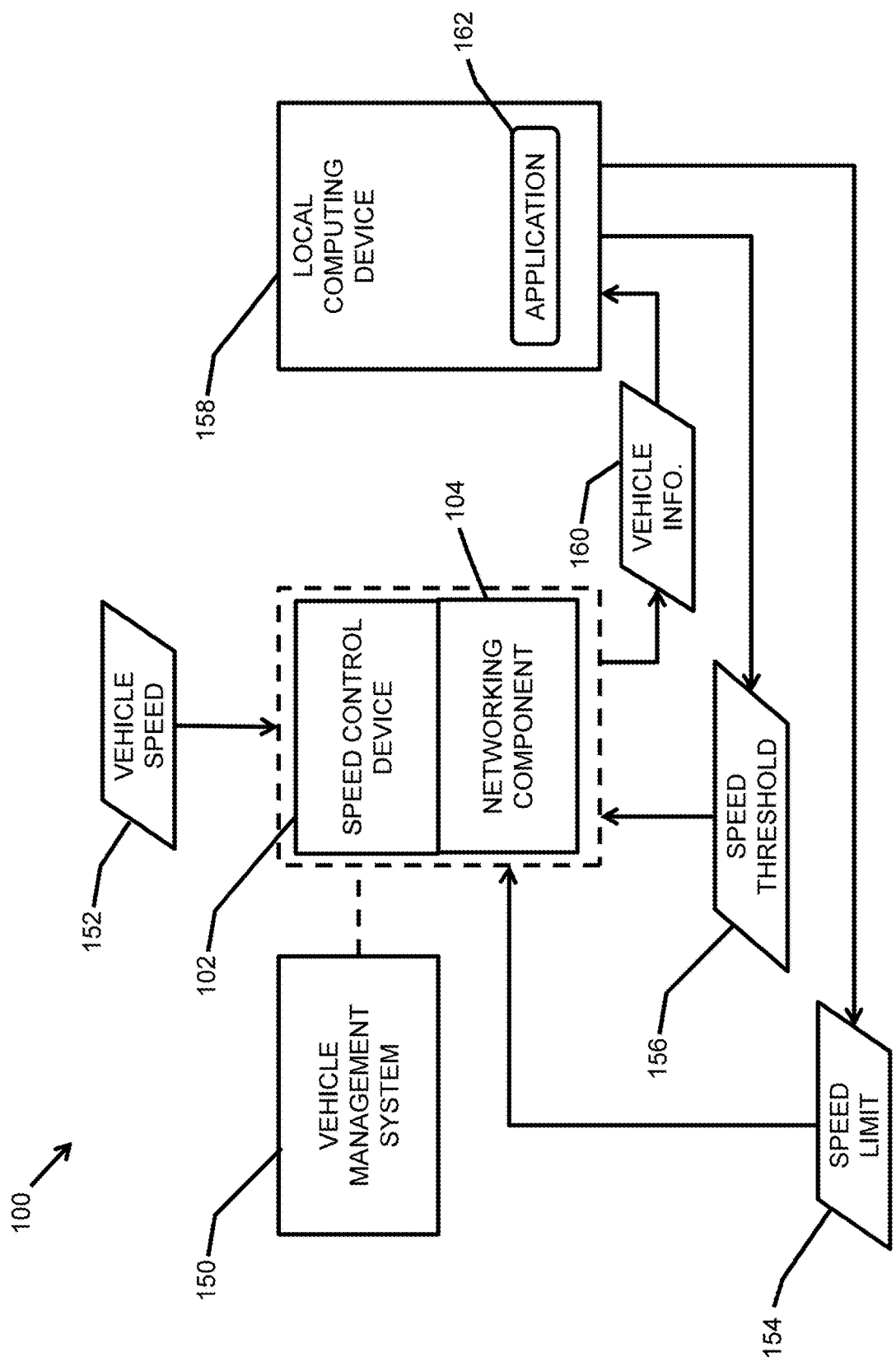
FIG. 1 is a schematic diagram illustrating an example implementation of a system for limiting a speed of a vehicle.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

In one aspect, a vehicle speed control system may be used to control the speed of a vehicle. In this aspect, speed control can be based at least upon the actual speed of the vehicle, a designated speed limit that has been set for the real-time location in which the vehicle is traveling, and a pre-determined speed limit threshold for the vehicle. As an example, the speed threshold associated with the vehicle or vehicle operator may be a threshold set above or below the actual designated speed limit at the location of the vehicle. In this aspect, the actual speed of the vehicle and designated speed limit may be identified, and an electronic throttle control system (e.g., coupled with the ECM) in the vehicle may be limited to allow the vehicle to travel at or below the threshold of the speed limit.

In one implementation, a system can be devised that may be used to control the speed of a vehicle. As an example, a vehicle operator may be subjected to certain speed limits associated with the location in which the vehicle is operated. These speed limits, for example, may be a result of local, state, and/or federal authorities imposing a vehicle speed limit based on a variety of conditions associated with the location. However, there is typically little preventing the vehicle operator from operating the vehicle at a speed that is higher than one designated for the location, other than the presence of authorities monitoring the location for speed limit violators, environmental conditions, road conditions, and vehicle limitations.

In this aspect, in one implementation, the example speed control system (e.g., speed limiter) can send a speed signal to the ECM that is indicative of an allowed speed, which is controlled by the threshold and the actual speed limit. In this implementation, the speed signal can correlate to a speed sensor position, such as an output from one or more pedal position sensors found coupled to an accelerator pedal, for example. That is, for example, the accelerator pedal in a vehicle is coupled with one or more pedal position sensors that detect the position of the accelerator pedal, and output a signal correlated to the position (e.g., and the rate of change from a first position to a second position). In this example, the output signal from the position sensor(s) can be indicative of the desired speed of the vehicle, as determined by the vehicle operator's activation of the pedal.

In one implementation, in this aspect, the speed control system can be communicatively disposed between the pedal position sensor(s) and the ECM. In this implementation, the speed control system can output a generated speed signal to the ECM that indicates a controlled speed, for example, that mimics the output of the pedal position sensors correlating to that same speed. In this example, the actual output signal from the pedal position sensor(s) may not match the output generated speed signal from the speed control system. In one example, the vehicle operator may depress the pedal to a first position, which correlates to a speed that is greater than the speed threshold allows, and the output generated speed signal from the speed control system may be correlated to a second position, which indicates a speed less than the first position.

In one implementation, in this aspect, the correlation between the pedal position and the output signal from the set of position sensors can comprise a position sensor profile. For example, position sensor profile can comprise a function representative of a relationship between the actual position of the pedal as detected by the sensor(s) and the output speed signal from the sensor(s) in response to the detected position. In one implementation, the output speed signal can comprise an electrical voltage (e.g., or some other property of electricity) indicative of a speed correlated to the pedal position. As another example, a position sensor profile can comprise a database, table, or graph that stores or identifies a correlation between a pedal position and the output signal from the sensor(s).

As an illustrative example, most accelerator pedals contain two or more position sensors whose output signal (e.g., a voltage and/or current value) is dependent of the position of the accelerator pedal, having a range of completely depressed to completely released. In this example, an associated sensor profile can be illustrated as a graph of the sensor output signals across the range of pedal positions. However, pedal profiles are typically different between different vehicles.

The following describes an environment where one or more portions of one or more techniques and systems may be utilized.

In one aspect, a vehicle speed limiting system may implement a pedal position sensor profile, which can be automatically detected, recorded and created, as described herein. As an illustrative example, a vehicle speed limiting system may be used to limit a speed at which the vehicle can travel based at least upon a detected speed of the vehicle, a designated speed limit set for the location (e.g., identified in real-time, and possibly real-time detected heading) of the vehicle, and a pre-determined speed threshold identified for the vehicle at the time of use. That is, for example, the system may be used to limit the vehicle speed to a speed threshold associated with the designated speed limit, such as a certain amount above or below (e.g., or even at) the designated speed limit for the vehicle location. In this way, for example, an authorized system user may provide a desired threshold speed limit value for the system, such as five miles per hour (mph) above the designated speed limit for the location. In this example, the vehicle may mitigate operation of the vehicle above the five mph threshold over the designated speed limit at locations with a designated speed limit.

FIG. 1 is a schematic diagram illustrating an exemplary system 100 for limiting a speed of a vehicle. In this implementation, the exemplary system 100 can comprise a speed control device 102 that is operably coupled with a vehicle management system 150 (e.g., vehicle's engine management system). The speed control device 102 can be configured to limit an engine speed based at least upon: an identified speed of the vehicle 152; a pre-determined speed limit 154 for a location of the vehicle; and a pre-determined speed threshold 156 for the vehicle. For example, a vehicle can comprise an electronic throttle control (ETC) that transmits a signal to an engine control component, where the signal is indicative of a desired engine speed, and the signal is based upon a throttle position identified by the ETC. That is, in this example, the ETC and engine controller can replace a mechanical linkage between a gas pedal and throttle that has previously been utilized in vehicles to control engine speed, and therefore vehicle speed.

In one implementation, the speed control device 102 may be configured to receive a throttle signal from the ETC. In this implementation, the ETC throttle signal can indicate a desired throttle position, for example, based at least upon the vehicle operator's (e.g., or a cruise control) interaction with a throttle controller (e.g., gas pedal). Further, in one implementation, the speed control device 102 may be configured to transmit a speed signal to the engine control component, which can control a speed (e.g., in revolutions per minute (RPMs)) of the engine. For example, controlling the speed of the engine typically results in a control in the speed of the vehicle, in conjunction with the transmission. Therefore, in this implementation, the speed control device 102 may receive the throttle signal from the ETC, indicative of a desired vehicle speed (e.g., based on the engine speed), and can transmit the speed signal to the engine control component to control the engine speed.

In one implementation, the speed control signal transmitted to the engine control component may be modified based upon the identified speed of the vehicle 152, the pre-determined speed limit 154 for a location of the vehicle; and the pre-determined speed threshold 156 for the vehicle. That is, for example, a vehicle speed sensor (e.g., global positioning system (GPS), speedometer, other velocity sensor) may identify a vehicle speed, and data indicative of the identified vehicle speed 152 can be received by the exemplary system 100. Further, the pre-determined speed limit can be identified for the location of the vehicle, for example, by identifying the location of the vehicle and identifying a set speed limit at that location, at that time. That is, streets, roads, highways and freeways typically have set speed limits, as set by the governing authority. The set speed limits are typically known, and may be accessible through a database (e.g., stored remotely) for respective vehicle locations. As one example, data indicative of the set speed limit information 154 for the vehicle location can be provided to the exemplary system 100.

Additionally, the pre-determined speed threshold for the vehicle 156 can be provided, for example, where the pre-determined speed threshold for the vehicle 156 may be set by an authorized user of the system 100. For example, an authorized user (e.g., parent of child driving vehicle, manager of fleet of vehicles, etc.) can identify a desired speed threshold buffer, such as a particular number of miles (e.g., or kilometers, or other speed measurement) per hour above the set speed limit that the vehicle may be allowed to travel (e.g., or merely at the set speed limit, if desired). As one example, a parent of a minor driver may wish that the minor driver be allowed to travel merely five mph above the set speed limit (e.g., can drive up to 60 mph in a 55 mph speed limit zone). In this example, the pre-determined speed threshold for the vehicle 156 may be set to five mph (e.g., approximately 8 kph).

The exemplary system 100 of FIG. 1 can comprise a networking component 104 communicatively coupled with the speed control device 102. The networking component 104 can be configured to communicate wirelessly with a local computing device 158 to provide the speed threshold information 156 from the local computing device 158 to the speed control device 102. Further, the networking component 104 can be configured to provide vehicle-related information 160 to the local computing device 158. In this implementation, the local computing device 158 can comprise an application 162 that may be used to provide the speed threshold information 156 for the speed control device 102, and may be used to receive the vehicle-related information 160.

As an example, in one implementation, the networking component 104 can comprise a small area networking component, configured to transmit and/or receive wireless data signals in a local area (e.g., within a desired range of a local computing device). In one example of a small area network, the network may utilize a low-power radio frequency communication system to create a personal-area network (PAN), or piconet (e.g., utilizing Bluetooth or similar low-power radio frequency (RF) communications). Small area networking components can communicate on a radio frequency of around 2.45 gigahertz (e.g., between 2.402 GHz and 2.480 GHz), sending and receiving low power signals of about 1 milliwatt, which may enable devices to connect in a network with a range of about 32 feet (e.g., 10 meters). Further, for example, such small area networking capable devices come within range of each other, a wireless RF handshake can occur to determine if there is data to share or if one device may control the other. Typically, the electronic conversation happens automatically, although authorization may be needed, and a local area network can be formed.

In the implementation of FIG. 1, for example, the networking component 104 may comprise a small area networking capable device that allows it to create a small area network with a small area networking capable device disposed in the local computing device 158. In this implementation, after a handshake and authentication between the networking component 104 and the local computing device 158, data, such as the speed threshold information 156 and the vehicle-related information 160 may be shared between the networking component 104 and the local computing device 158. Typically, information in a computer network is transmitted in data packets, which is a formatted unit of data (e.g., a list of bits or bytes) that is transmitted and/or received by a packet-switched network component. For example, in such data packet-based networks, formatted data packets can be sent using the RF signals over the network to their destination, where they can be assembled into their original message (e.g., speed threshold information 156, vehicle-related information 160, vehicle speed 152).

Further, in one implementation, the data indicative of the vehicle speed 152 may be provided by the local computing device 158 to the networking component 104. In this implementation, the local computing device 158 may comprise a system for determining the speed at which the vehicle is traveling, such as using a global positioning system, accelerometer, or combination of technologies, when the local computing device 158 is disposed in the vehicle. In another implementation, the data indicative of the vehicle speed 152 may be provided by the vehicle management system, such as by a speedometer, tachometer, GPS, or other sensor disposed in the vehicle.

Figure 2:
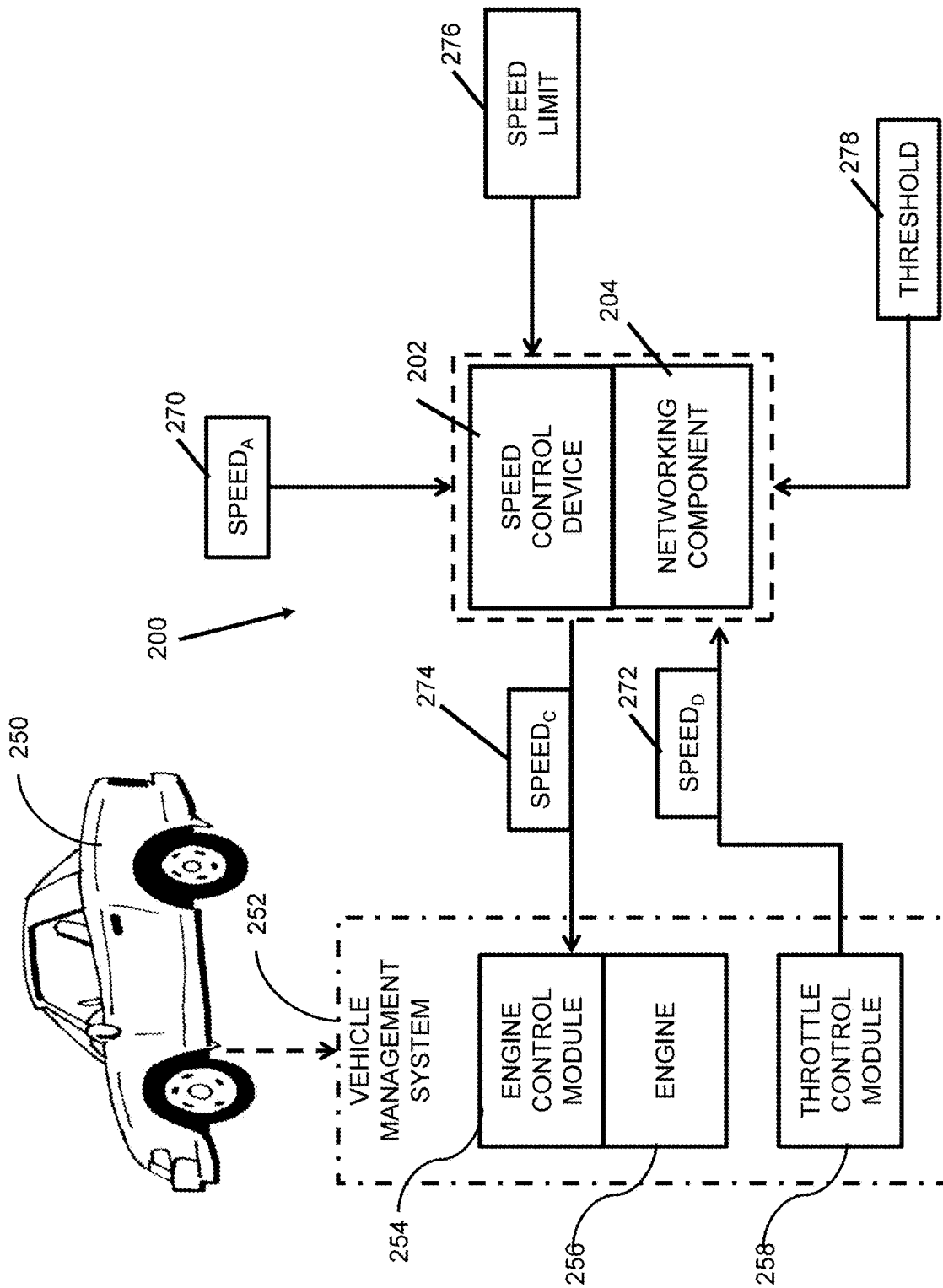
FIG. 2 is a schematic diagram illustrating an example implementation of one or more portions of one or more components described herein.

As an illustrative example, FIG. 2 is a schematic diagram illustrating one example implementation of an environment where a system 200 for limiting a speed of a vehicle may be implemented. In this implementation, a vehicle 250 can comprise a vehicle management system 252, which may be used to collect appropriate vehicle related data, and/or control various systems in the vehicle 250. For example, a vehicle management system can comprise one or more electronic control units (ECUs), which can be uses to control one or more electrical systems or subsystems in a vehicle.

An ECU may comprise an electronic/engine control module (ECM), speed control unit (SCU), engine control unit (ECU), powertrain control module (PCM), transmission control module (TCM), brake control module (BCM or EBCM), central control module (CCM), central timing module (CTM), general electronic module (gem), body control module (BCM), suspension control module (SCM), control unit, or other control modules, which, in combination, are often referred to as the vehicle's computer. ECUs can comprise one or more of the following: a core processor unit, such as a microcontroller; memory unit(s), such as comprising RAM, EEPROM and/or flash portions; input unit(s), such as supply voltage, digital input(s), analog input(s); output unit(s), such as relay driver(s), H bridge driver(s), injector driver(s), logic output(s); communication links, such a wired and/or wireless communication units; and housing for the ECU.

Returning to FIG. 2, the vehicle management system 252 can comprise a throttle control unit 258 (e.g., comprising a speed control unit (SCU)), which may be operably coupled (e.g., in communication with) a mechanical throttle actuated by a vehicle operator (e.g., a foot pedal throttle). Further, the vehicle management system 252 can comprise an engine control module 254 (e.g., comprising an engine control unit (ECU)), which may be operably coupled with a fuel control input for an engine 256, thereby controlling the speed of the engine 256. Additionally, when the example system 200 for limiting a speed of an vehicle is not installed in the vehicle 250, the throttle control unit 258 may be operably coupled (e.g., communicatively coupled) with the engine control module 254, for example, such that throttle related input from the operator is transmitted from the throttle control unit 258 to the engine control module 254 in order to control engine speed.

In this implementation, the example system 200 may be operably coupled between the throttle control unit 258 and the engine control module 254. In this way, data indicative of a desired speed 272 (SPEEDD), as provided by input from the operator can be received by the system 200. In one implementation, a speed control device 202 can be disposed between the throttle control unit 258 and the engine control module 254, and the speed control device 202 may receive the desired speed 272 from the throttle control unit 258. Further, in this implementation, the speed control device 202 may transmit data indicative of a controlled speed 274 (SPEEDc), where the controlled speed 274 may be based, at least, upon a speed limit 276 for the vehicle at its location, a speed threshold 278, and an actual speed 270 (SPEEDA) of the vehicle.

For example, a speed limit 276 for a vehicle traveling at the vehicle's location, at the time of travel, can be identified and provided to the example system 200, such as through the networking component 204 or directly to the speed control device 202. Further, in this example, a threshold speed value 278 for the vehicle, such as an upper limit of vehicle speed above the speed limit, can be provided to the example system 200, such as through the networking component 204 or directly to the speed control device 202. Additionally, in this example, the actual speed 270 that the vehicle is traveling can be provided to the example system 200, such as through the networking component 204 or directly to the speed control device 202. In this example, the speed control device 202 may provide the controlled speed 274 to the ECU 254, where the controlled speed 274 comprises a speed that is less than or equal to the sum of the threshold value 278 and the speed limit 276, which may comprise an increase, decrease, or no-change from the actual speed 270 of the vehicle. For example, the threshold value 278 may be five mph (e.g., 5 miles per hour over the speed limit; or zero, one, ten, negative 5, whatever is desired), and the speed limit 276 may be twenty-five mph. In this example, the controlled speed 274 value would be no greater than thirty mph. However, if the desired speed 272 is less than (e.g., or equal to) thirty mph, in this example, the controlled speed 274 may be equivalent to the desired speed 272.

Figure 3:
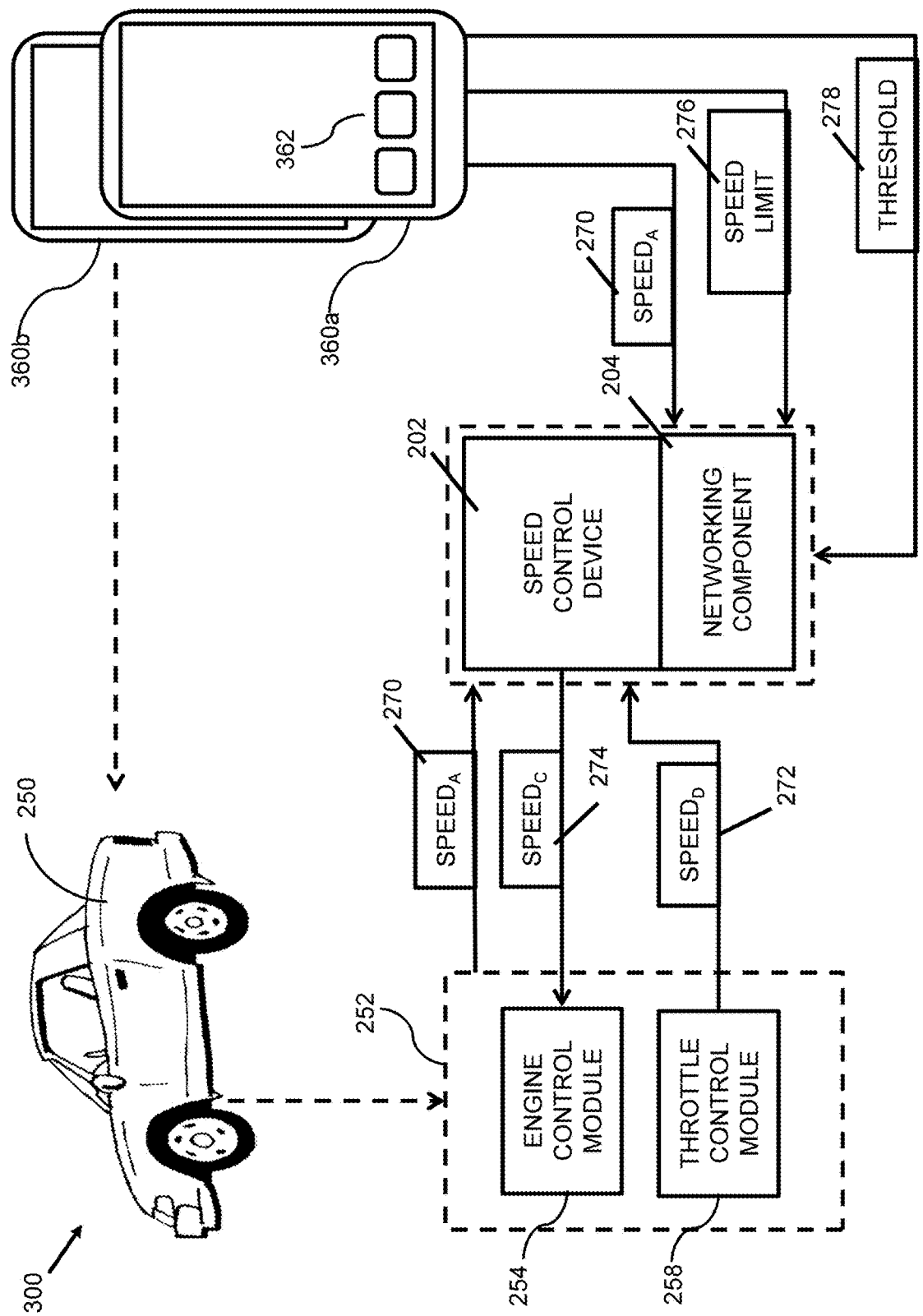
FIG. 3 is a component diagram illustrating an example implementation of one or more portions of one or more components described herein.

FIG. 3 is a schematic diagram illustrating an example implementation 300 of one or more portions of one or more systems described herein. In this example implementation 300, a first computing device 360a may comprise one or more applications 362 configured to facilitate use of a system for limiting a speed of a vehicle. For example, the first computing device can comprise a portable device, such as a smartphone, tablet, laptop, or other mobile computing device, utilized by an authorized system manager to set up and manage the example system. In one implementation, the authorized system manager (e.g., parent, fleet manager, etc.) can activate one or more of the one or more applications 362 on the first computing device 360a, and input a desired speed threshold 278 for an operator of the vehicle 250 (e.g., child of parent, driver in fleet, etc.).

After the first computing device 360a is communicatively coupled with the networking component 204 of the example system, such as using a wireless networking system (e.g., radio frequency (RF) base, infrared based, etc.), the desired speed threshold 278 can be uploaded to the speed control device 202, using the networking component 204. In one implementation, the desired speed threshold 278 may comprise identification information that links the desired speed threshold 278 to a particular vehicle operator and/or vehicle. In one implementation, the desired speed threshold 278 may be set for a particular vehicle (e.g., 250) by default, and the default speed threshold 278 may be deactivated by an authorized user, for example, which could allow the vehicle 250 to travel at speeds outside the desired threshold 278.

As an example, the first computing device 360a may be used to provide information to the example system, such as the speed threshold 278, vehicle identifier, user identifier, where the user may be identified by a second computing device 360b disposed in the vehicle 250 during operation. That is, for example, a fleet manager or vehicle owner may use their mobile device 360a to communicatively couple with the networking component 204, such as wirelessly (e.g., Wi-Fi, Bluetooth, etc.), for example. In this example, utilizing an application 362 resident on the mobile device 360a the manager/owner can set the speed threshold for the vehicle, and/or for a particular vehicle operator (e.g., driver). In this example, the vehicle 250 may merely be able to travel at speeds within the speed threshold 278 of the speed limit 276.

As an example, a vehicle operator may utilize a second mobile device 360b while operating the vehicle 250. In this example, the operator can communicatively couple their device 360b with the networking component 204. During operation, a speed limit 276 may be provided to the networking component 204 from the second device 360b, such as by identifying a location of the vehicle 250, and identifying a speed limit set for that location (e.g., from a mapping application or database available to the mobile device 360b). Further, during the vehicle operation, the actual speed 270 can be provided to the networking component 204 by the second device 360b, such as using GPS data, or the like. In another example, the actual speed 270 can be provided to the speed control device 202 (e.g., or networking component 204) from the vehicle management system 252, such as from a speed sensor or on-board GPS system. As another example, the speed limit 276 information can be provided to the speed control device 202 (e.g., or networking component 204) from the vehicle management system 252 such as from a location service (e.g., GPS) linked to a speed limit database (e.g., on-board or remotely dispositioned).

As another example, an example speed control system may merely allow the vehicle 250 to operate within the speed threshold 278 unless the operator's mobile device 360a, 360b is communicatively coupled with the networking component 204. In this example, the example speed control system may have a preset speed threshold 278, and, unless otherwise overridden, the vehicle 250 may merely operate within the speed threshold 278. For example, an authorized user may communicatively couple there mobile device 360a with the networking component 204, which can subsequently deactivate the preset speed threshold 278; or, alternatively, change the speed threshold 278 to a different threshold set for that particular operator.

A method may be devised for limiting a vehicle's speed, such as, based on a desired threshold speed of the actual speed limit. That is, for example, a vehicle's location may be used to identify an actual speed limit for the location, such as using a GPS in association with a database (e.g., stored locally or remotely) of speed limits for locations expected to be travelled by the vehicle. Further, the vehicle's management system may be utilized to limit the vehicle's speed to within the desired threshold, for example, regardless of desired speed input by the operator.

Figure 4:
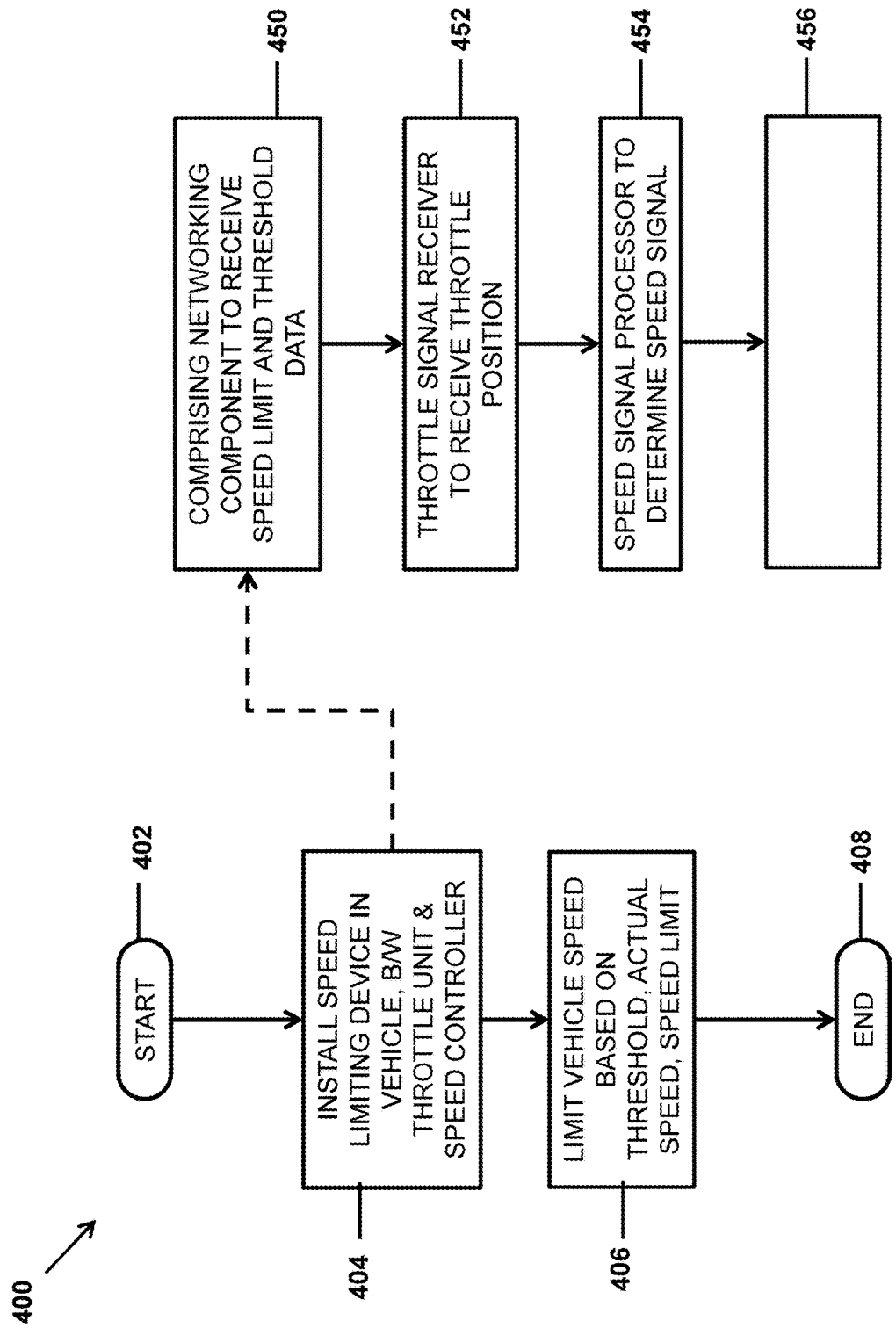
FIG. 4 is a flow diagram illustrating an example implementation of an exemplary method for limiting a speed of a vehicle.

FIG. 4 is a flow diagram illustrating an exemplary method 400 for limiting a vehicle's speed. The exemplary method 400 begins at 402. At 404, a speed limiting device can be installed in the vehicle communicatively between a throttle signal unit and an engine speed controller. In this implementation, the speed limiting device can comprise a network communicator, at 450, that is configured to wirelessly receive data from one or more applications operating on a local computing device. In this implementation, the data can be indicative of a pre-determined speed limit for a location of a vehicle comprising the device and a pre-determined speed threshold for the vehicle.

Further, the speed limiting device can comprise a throttle signal receiver that is configured to receive data indicative of a desired throttle position from a throttle signal unit in the vehicle. Additionally, the speed limiting device can comprise a speed signal processor configured to identify a speed signal based at least upon the data indicative of a desired throttle position, the data indicative of the pre-determined speed limit for a location of a vehicle comprising the device, the identified speed of the vehicle, and the pre-determined speed threshold for the vehicle. The speed limiting device can also comprise an engine speed signaler that is configured to transmit the speed signal identified by the speed signal processor to an engine speed controller in the vehicle, where the speed signal indicative of a speed for the vehicle at the location. In this implementation, the speed limiting device can be configured to be installed in the vehicle communicatively between the throttle signal unit and the engine speed controller.

At 406, the vehicle speed can be limited to within the desired threshold of the speed limit, based on the desired threshold, the actual speed of the vehicle, and the speed limit for vehicles at the actual location of the vehicle. Having installed the speed limiting device, and limiting the vehicle's speed, the exemplary method ends at 408.

Figure 5:
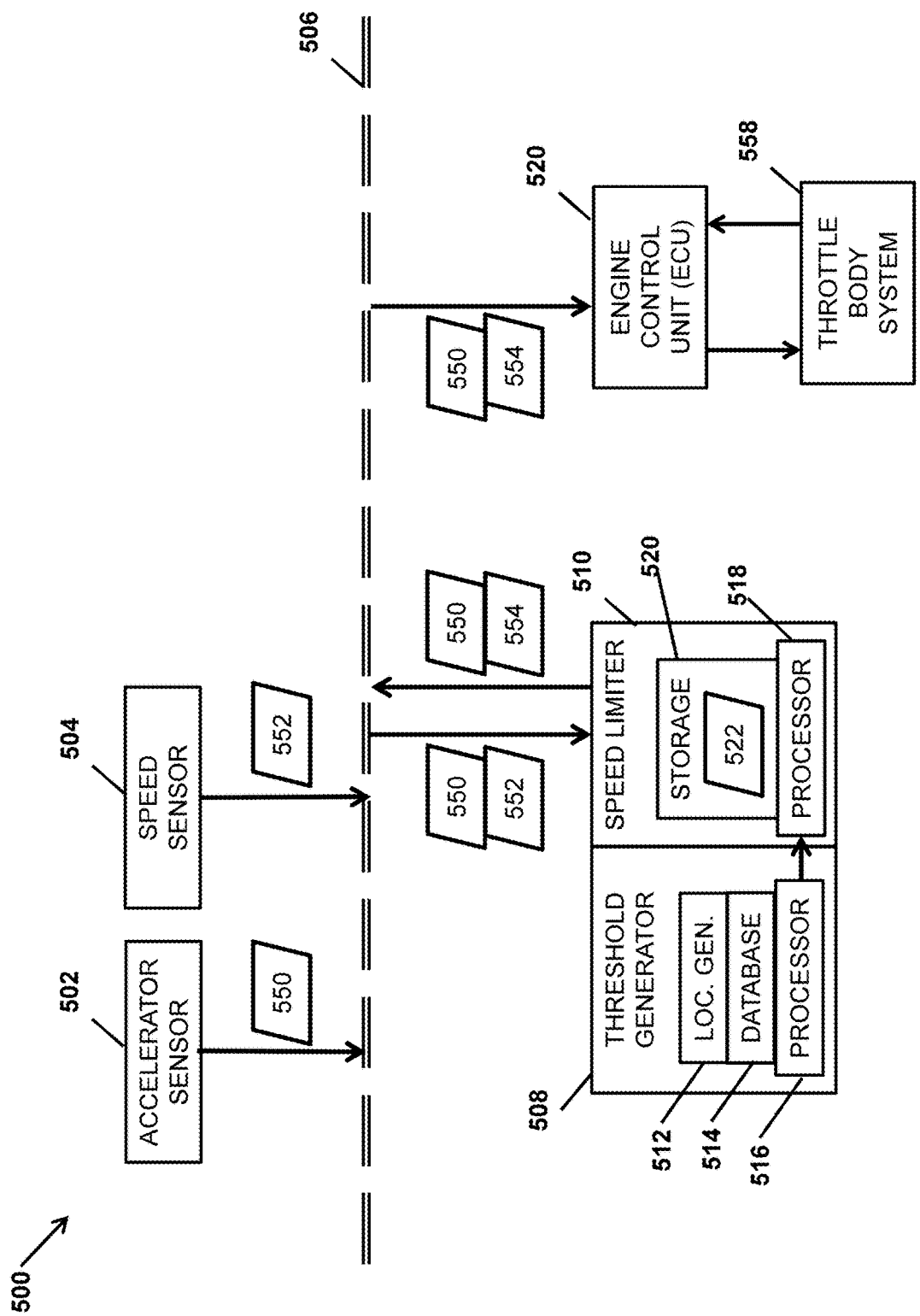
FIG. 5 is a schematic diagram illustrating an implementation of an exemplary system for limiting speed of a vehicle.

FIG. 5 is a schematic component diagram of an embodiment where an example system 500 may be implemented for speed limiting in a vehicle. In this implementation, a plurality of components may be operably engaged with a vehicle communication bus 506, such as a controller area network (CAN) bus. In this implementation, a vehicle accelerator sensor 502 is coupled with the bus 506, and transmits data indicative of a desired speed signal 550, such as a speed desired by the operator of the vehicle resulting from depression of an accelerator pedal (e.g., or some other throttle signaling device). Further, a vehicle speed sensor 504 is coupled with the bus 506, and transmits data indicative of a sensed speed 552 of the vehicle, such as from a sensor on a wheel system, driveshaft, transmission, crankshaft, or some other location designed to identify speed. Additionally, in this implementation, an engine control unit 520 (ECU) is couple with the bus 506. The ECU can be configured to, among other things, manage the throttle system 558, comprising the throttle body, fuel input, air input, and other systems, to allow the vehicle to move at the desired and/or appropriate speed.

In this implementation, in FIG. 5, a speed limiter component 510 can be coupled with the bus 506. The speed limiter is configured to limit a speed of a vehicle based at least upon a speed signal 550 received from the speed signal generator 502 and a sensed speed 552 received from a vehicle speed sensor 504. Further, the speed limiter 510 is communicatively coupled with the speed signal generator 502 and the vehicle ECU 520. Additionally, the speed limiter 510 comprises a speed signal processor 518 configured to compares a combination of the speed signal 550 and the sensed speed 552 with a threshold speed 522 stored in local storage memory 520. Additionally, the speed limiter 510 is configured to transmit data to the communication bus, resulting in communication of the speed signal 550 to the ECU 520 if the combination is less than or equal to the threshold; or communication of a modified speed signal 554 to the ECU 520 if the combination is greater than the threshold.

Additionally, in this implementation 500, a speed threshold generator 508 is communicatively coupled with the speed limiter 510, and is configured to provide the threshold speed 522 to the speed limiter 510 based at least upon a location of the vehicle. The speed threshold generator 508 comprises a location generator 512 that is configured to identify the location of the vehicle. The speed threshold generator 508 also comprises a speed database 514 that comprises data indicative of locations with corresponding speed limits. In one implementation, a processor 516 can be used to identify the speed limit associated with the identified location, using the database 514. The threshold speed 522 can be communicated to the speed limiter 510, which may be based on the identified speed limit, and can be stored in local memory 520 in the speed limiter 510.

As an example, a vehicle operator may operate a throttle indicator (e.g., accelerator pedal, throttle lever, handle, button, etc.) intending to increase (e.g., or decrease) the speed of the vehicle. The accelerator sensor 502 can detect the desired speed signal 550 from the throttle indicator and transmit the desired speed signal 550 to the vehicle CAN 506. In this example, the real-time speed of the vehicle is detected by the speed sensor 504, and the sensed speed 552 is transmitted to the vehicle CAN 506. Further, in this example, the speed limiter 510 receives the speed signal 550 and sensed speed 552 from the CAN 506, and combines them to identify the potential resulting speed of the vehicle if the speed signal 550 is applied by the ECU 520. The limiter processor 518 compares the resulting speed to the stored speed threshold 522 to determine what to do with the speed signal 550. In this example, if the combined speed is less than the threshold 522, the speed signal 550 can be sent back to the CAN 506 in an unaltered condition. However, in this example, if the combined speed is greater than the threshold 522, the speed limiter 510 modifies the speed signal 550, resulting in a modified speed signal 554 being sent to the CAN 506. The resulting modified speed signal 554 may be data that is indicative of a lower speed than that desired by the vehicle operator, such that the ECU 520 operates the throttle system 558 at a speed lower than may have resulted from the original speed signal 550.

Additionally, in this example, the threshold speed 522 stored in the speed limiter memory 520 may be a result of the threshold generator 508. In this example, the threshold generator 508 can detect a location of the vehicle, in real-time, using the location generator 512 (e.g., comprising a global positioning system (GPS component). In this example, the local processor 516 may use the identified vehicle location to look up a speed limit associated with that location in the database 514. The database 514, stored in local storage memory (e.g., memory unit(s), such as comprising RAM, EEPROM and/or flash portions), can comprise data indicative of locations (e.g., GPS coordinates), respectively linked to speed limits that are set for that locations, such as by local or federal authorities. In this way, for example, the real-time location of the vehicle can be used to identify an actual posted speed limit for that location. In this example, the local processor 516 may use the identified speed limit to generate the speed threshold 522. For example, the speed threshold may be a combination of the identified speed limit and a pre-determined threshold range above (e.g., or below) the identified speed limit. As one example, a threshold range may be five miles per hour (e.g., or kilometers, knots, etc.). Therefore, the speed threshold, in this example, may be five miles per hour above the identified speed limit.

Figure 6A:
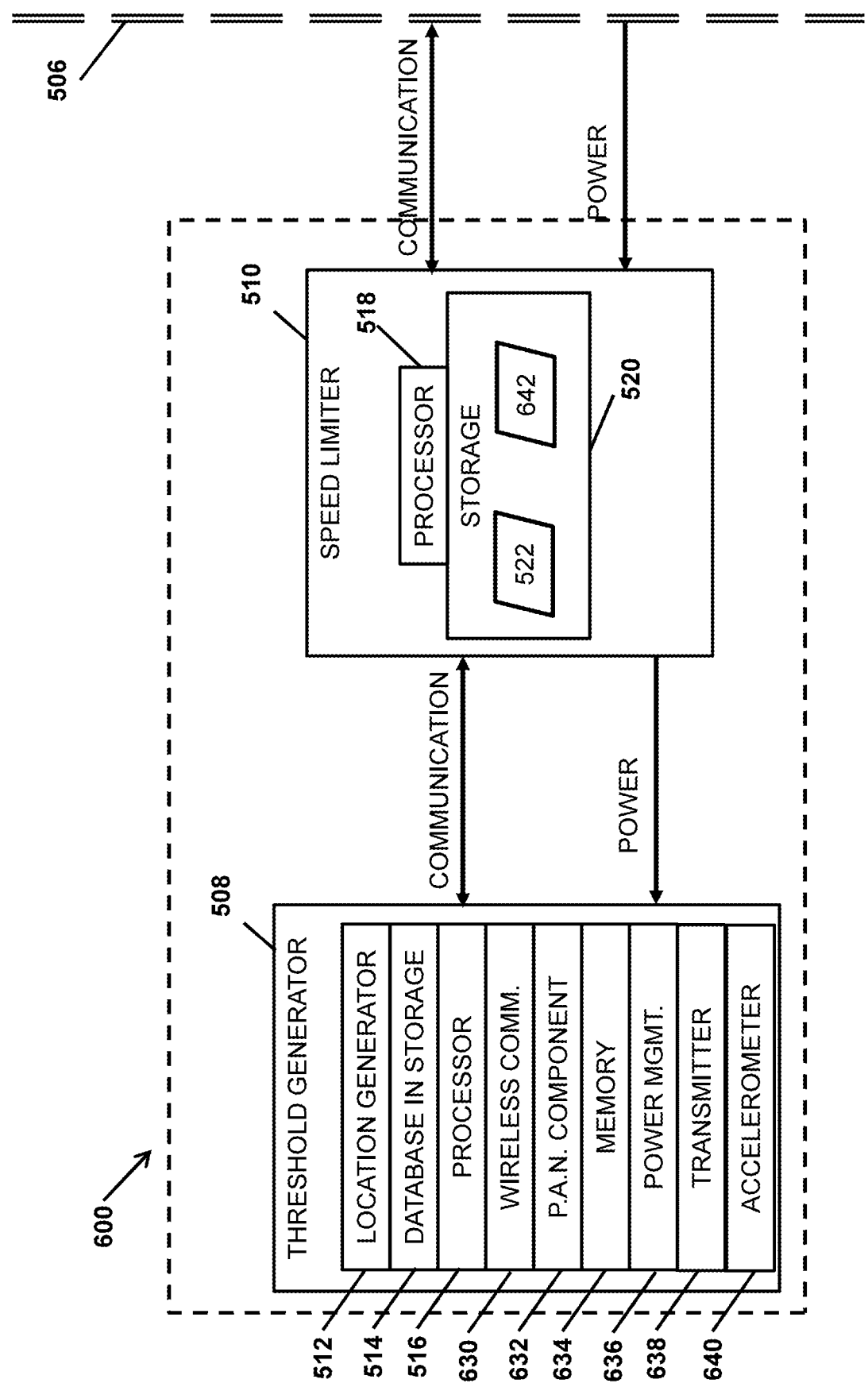
FIG. 6A is a schematic diagram illustrating an example implementation of one or more portions of one or more components described herein.

With continued reference to FIG. 5, FIG. 6A is a schematic component diagram of an example implementation of a system 600 for speed limiting in a vehicle. In one implementation, as illustrated in the example system 600, the speed limiter 510 can comprise a speed signal modifier 642 that is resident as a program in local memory 520. In this implementation, the speed signal modifier 642 can be configured to direct the speed signal processor 518 to generate the modified signal 554 by altering speed signal 550 data to modified data indicative of a lower speed than that indicated by the speed signal 550. In one implementation, the modified speed signal 554 can comprise data that is indicative of a reduction in a voltage reading from the speed signal generator. That is, for example, the speed signal 550 may comprise a voltage reading from the accelerator sensor 502, such as one or more potentiometers or Hall effect sensors, that are indicative of a location of the throttle indicator (e.g., pedal). In this example, the modified signal 554 can comprise data indicative of a lower voltage (e.g., or higher) than the original speed signal 550.

In one implementation, the speed threshold generator 508 can be coupled directly with the speed limiter 510, and power (e.g., electrical power) can be provided to the speed threshold generator 508 through the speed limiter 510. For example, power can be provided to the speed limiter 510 from the CAN 506, and power can be provided to the speed threshold generator 508 from the speed limiter 510. Further, in one implementation, the speed threshold generator 508 can comprise an on-board power management system 636 that comprises a rechargeable power storage component for storing power for and providing power to the speed threshold generator, and/or a charge management component for managing power to power storage, and to provision of power for the speed threshold generator.

In one implementation, the speed threshold generator 508 can comprise a personal area network (PAN) wireless component 632 for creating a PAN with one or more proximate devices. That is, for example, the PAN wireless component 632 can comprise a Bluetooth or Wi-Fi module that is able to communicate with proximate devices, such as a smart-phone, tablet, or other mobile device to set up a PAN, such as to communicate data between the speed threshold generator 508 and the proximate device. Further, the speed threshold generator 508 can comprise a wireless mobile telecommunications component 630 to provide mobile broadband access to and/or from the speed threshold generator 508. In this way, for example, the example system 600 may be able to communicate in real-time with one or more remote devices or networks, such as cloud-based systems, remote computers, etc.

Figure 6B:
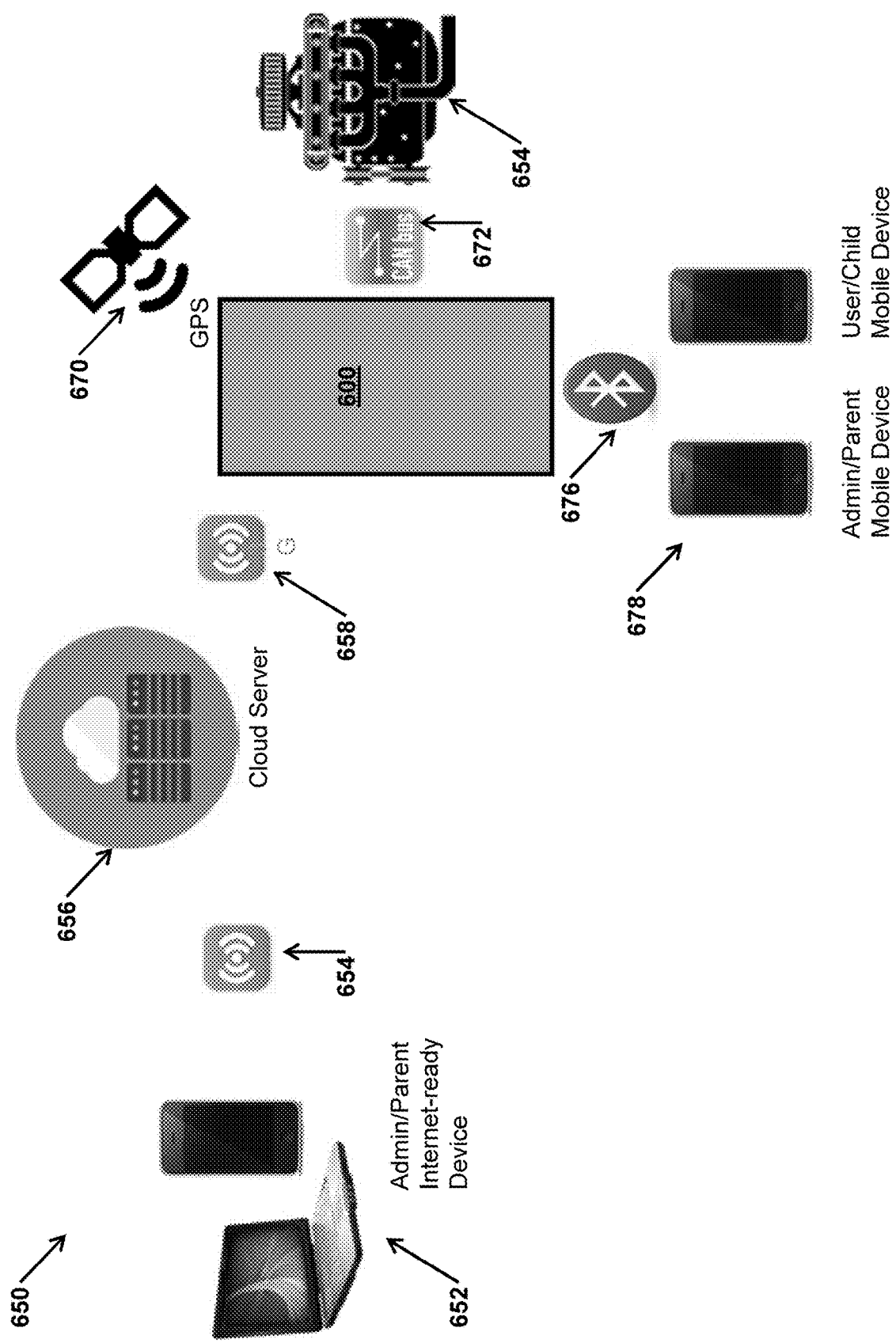
FIG. 6B is a component diagram illustrating an example implementation of one or more portions of one or more components described herein.

As an illustrative example, FIG. 6B is a component diagram illustrating an example implementation 650 of one or more portions of one or more systems described herein. In this example, the example system 600 may be communicative coupling with one or more local devices 678, such as mobile phones, over a PAN using Bluetooth 676 communication. Further, in this example, the example system 600 can be wirelessly coupled with a cloud-based system 656 over a 3G (e.g., or higher) cellular network 658. Additionally, the example system 600 can be linked to a global positioning system 670 to identify a location and heading (e.g., in real-time, such as using a GPS unit) of the vehicle, where the threshold speed is based at least upon the location and heading of the vehicle. In this way, in this example, an administrator or parental may use a remote device 652 to link to the cloud service 656 using a resident application or web-based application, with an account via the Internet 654. The administrator or parental may also use a local device 678 to link to the system 600 via the local PAN, by using a local application on the device, or a web-based app linked through the device.

In this example, using one or more applications, programs, web-apps, etc., an administrator or parent can receive real time alerts based on geo-fenced locations; can identify real-time user locations; receive emergency or crash notifications remotely. Further, using an app with a local connection 676, for example, the administrators or parents can set the speed threshold range; set a top speed; activate or deactivate the system; update firmware resident on the system; review trip data stored on the device. Additionally, a user/operator may link locally 678 using a local device 678 to download trip history and sync to servers; display trip history stored locally on the system 600; send reminder notifications to connect and download trip history; access inexperienced driver assistance and helpful driving tips; receive safe driving rewards; sync with administrator accounts; and/or use other app such as "find my car."

In one implementation, as illustrated in FIG. 6A, the threshold generator 508 can comprise an accelerometer 640 for detecting magnitude and direction of proper acceleration. That is, for example, proper acceleration can be indicative of rapid acceleration and/or deceleration of a vehicle over a short period of time. This information can be useful to identify unsafe driving (e.g., rapid acceleration) and quick stop, such as crashes (e.g., rapid deceleration). In one implementation, such instances may be used to trigger alerts to administrators, emergency responders, and others as set up by the administrators.

In another implementation, the speed threshold generator 508 can comprise local memory and/or memory storage (e.g., memory unit(s), such as comprising RAM, EEPROM, solid state drives, and/or flash portions) for storing the speed database 514, the speed threshold range, current vehicle status information, and/or historical vehicle status information. For example, the memory 634 can comprise non-volatile memory that is able to store vehicle trip data, vehicle usage, speeds, locations, alerts, etc. Further, the memory 634 can comprise programming that provides direction for the processor to execute appropriate functions. As another example, the memory can store the threshold range set (e.g., and updated as needed) by the administrator. The threshold range can be used by the processor to create the threshold speed 522, where the threshold speed comprises a number of speed units (e.g., miles per hour), equal to or greater than zero, that is indicative of an amount above a local speed limit allowed for the vehicle, as described above.

In one implementation, the speed threshold generator 508 can comprise a transmitter 638 to transmit data indicative of the vehicle speed threshold 522 to the communicatively coupled vehicle speed limiter 510, to limit the speed of a vehicle. As an example, the transmitter 638 can comprise a universal asynchronous receiver transmitter (UART) that is used to transmit data indicative of the vehicle speed threshold 522 to the vehicle speed limiter 510. In one implementation, the vehicle speed limiter 510 may respond to receipt of the vehicle speed threshold 522 merely with an acknowledgement that the data has been received.

Figure 7:
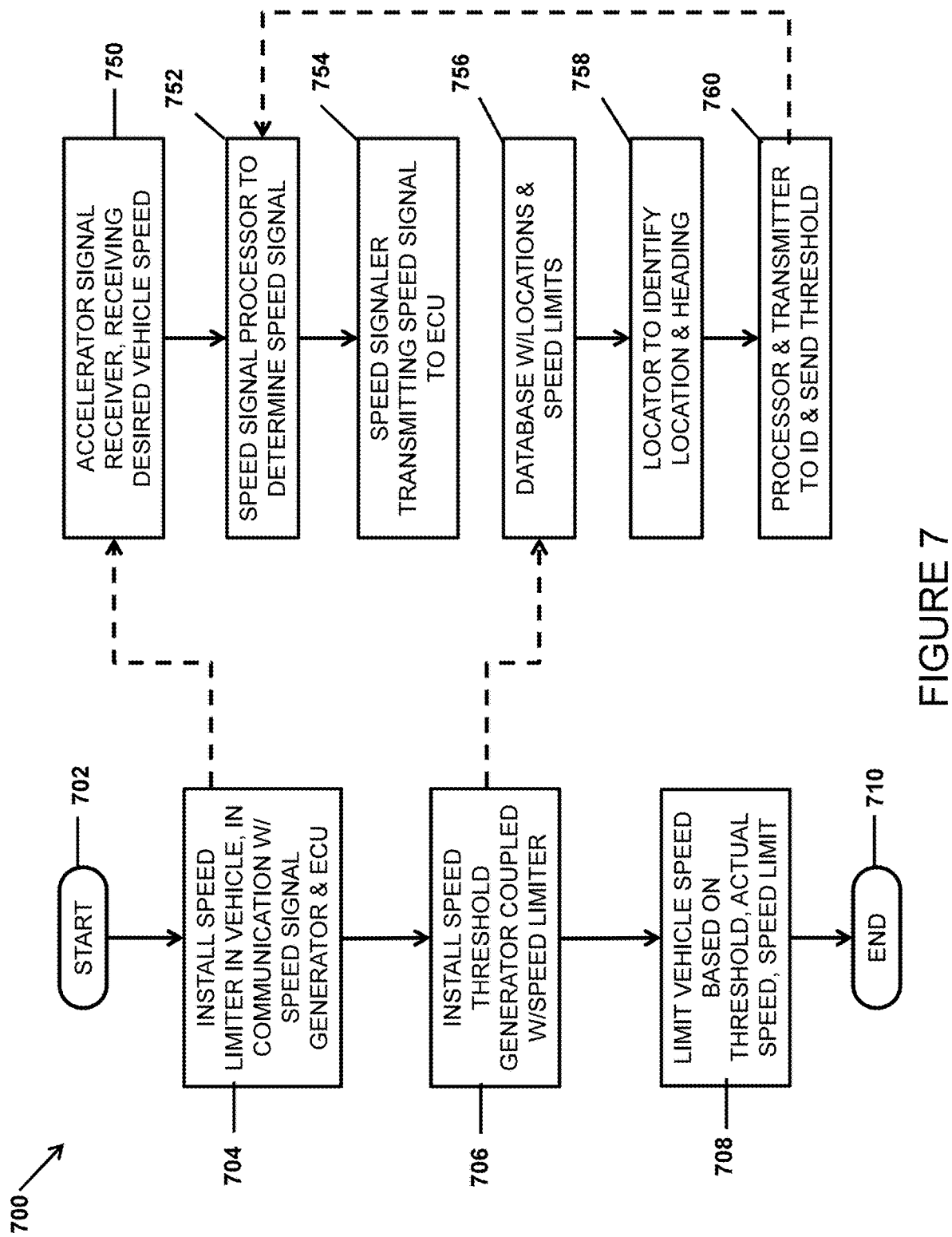
FIG. 7 is a flow diagram illustrating an exemplary method for limiting a speed of a vehicle.

FIG. 7 is a flow diagram illustrating an example method 700 for limiting a vehicle's speed. The example method 700 starts at 702. At 704, a speed limiting device is installed in a vehicle in communicative coupling with a vehicle accelerator signal generator and a vehicle electronic control unit (ECU). In this implementation, the speed limiting device comprises an accelerator signal receiver 750 configured to receive data indicative of a desired vehicle speed from the vehicle accelerator signal generator. Further, the speed limiting device comprises a speed signal processor 752 configured to identify a speed signal, based at least upon a combination of the data indicative of the desired vehicle speed and an identified actual vehicle speed, which is compared to a pre-determined vehicle speed threshold. The speed signal comprises data that is indicative of the desired vehicle speed if the combination is less than or equal to the threshold; or a modified speed signal if the combination is greater than the threshold, the modified speed signal indicative of a speed less than the desired vehicle speed. The speed signal processor also comprises speed signal transmitter that transmits the speed signal to the ECU.

At 706, in the example method 700, a vehicle speed threshold device is installed in the vehicle in communicative coupling with the speed limiting device. The vehicle speed threshold device comprises a database 756 resident in memory and comprising data indicative of a plurality of locations respectively linked to data indicative of a speed limit. Further, the vehicle speed threshold device comprises a locator component 758 configured to identify the vehicle's location and heading (e.g., in real-time). Additionally, the vehicle speed threshold device comprises a processor and transmitter 760. The processor is configured to identify a speed limit for the vehicle's location using the database, in order to generate the vehicle speed threshold based at least upon the speed limit and a pre-determined speed limit adjustment. The transmitter is configured to transmit data indicative of the vehicle speed threshold to the speed limiting device.

At 708 in the example method 700, the vehicle speed can be limited base on the threshold, the actual speed of the vehicle, and the identified speed limit. Having limited the vehicle's speed, the example method ends at 710.

Figure 8:
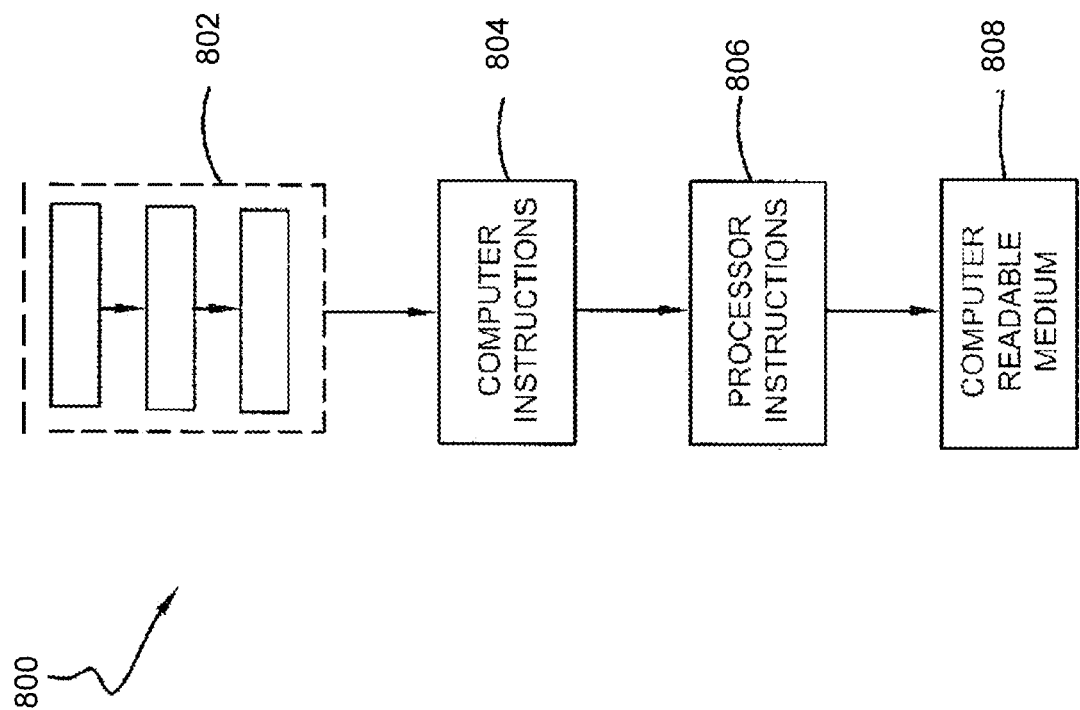
FIG. 8 is an illustration of an exemplary computer-readable medium comprising processor-executable instructions configured to embody one or more of the provisions set forth herein.

In another implementation, a computer-readable medium may comprise processor-executable instructions that can be configured to implement one or more portions of the one or more techniques presented herein. An example computer-readable medium is illustrated in FIG. 8, where the implementation 800 comprises a computer-readable medium 808 (e.g., a CD, DVD, Blu-ray, hard disk drive, flash-drive, solid-state memory, non-volatile memory storage component), on which is encoded computer-readable data 806. This computer-readable data 806 in turn comprises a set of computer instructions 804 that can be configured to operate in accordance with one or more of the techniques set forth herein. In one such implementation 802, the processor-executable instructions 804 may be configured to perform a method, such as at least some of the exemplary method 700 of FIG. 7. In another such implementation, the processor-executable instructions 804 may be configured to implement a system, such as at least some of the exemplary system 500 of FIG. 5. Many such computer-readable media may be devised by those of ordinary skill in the art that are configured to operate in accordance with the techniques presented herein.

Figure 9:
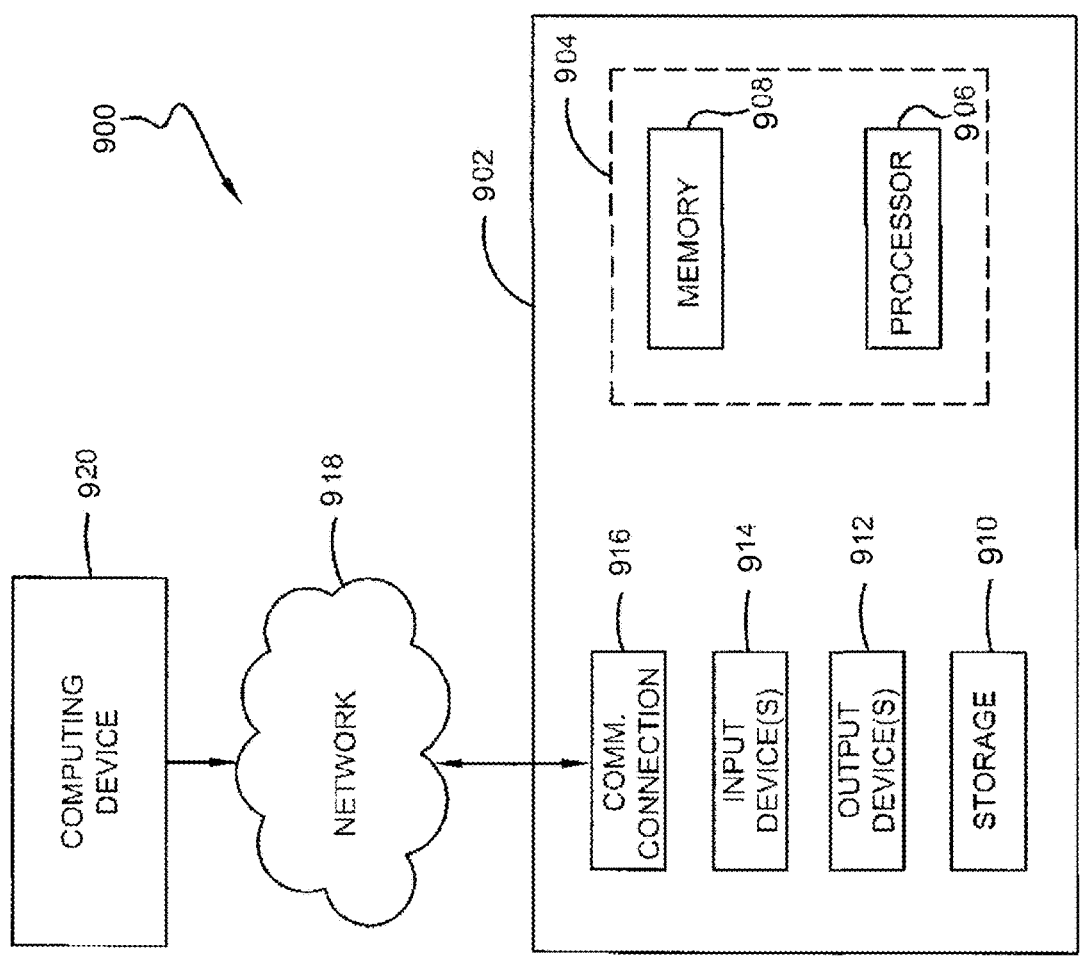
FIG. 9 illustrates an exemplary computing environment wherein one or more of the provisions set forth herein may be implemented.

FIG. 9 and the following discussion provide a brief, general description of a computing environment in/on which one or more or the implementations of one or more of the methods and/or system set forth herein may be implemented. The operating environment of FIG. 9 is merely an example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, mobile consoles, tablets, media players, and the like), multiprocessor systems, consumer electronics, mini computers, mainframe computers, distributed computing environments that include any of the above systems or devices, and the like.

Although not required, implementations are described in the general context of "computer readable instructions" executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 902 configured to implement one or more implementations provided herein. In one configuration, computing device 902 includes at least one processing unit 909 and memory 908. Depending on the exact configuration and type of computing device, memory 908 may be volatile (such as RAM, for example), non-volatile (such as ROM, flash memory, etc., for example) or some combination of the two. This configuration is illustrated in FIG. 9 by dashed line 904.

In other implementations, device 902 may include additional features and/or functionality. For example, device 902 may also include additional storage (e.g., removable and/or non-removable) including, but not limited to, magnetic storage, optical storage, and the like. Such additional storage is illustrated in FIG. 9 by storage 910. In one implementation, computer readable instructions to implement one or more implementations provided herein may be in storage 910. Storage 910 may also store other computer readable instructions to implement an operating system, an application program and the like. Computer readable instructions may be loaded in memory 908 for execution by processing unit 909, for example.

The term "computer readable media" as used herein includes computer storage media. Computer storage media includes volatile and nonvolatile, removable and non-removable media implemented in any method or technology for storage of information such as computer readable instructions or other data. Memory 908 and storage 910 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 902. Any such computer storage media may be part of device 902.

Device 902 may also include communication connection(s) 919 that allows device 902 to communicate with other devices. Communication connection(s) 919 may include, but is not limited to, a modem, a Network Interface Card (NIC), an integrated network interface, a radio frequency transmitter/receiver, an infrared port, a USB connection or other interfaces for connecting computing device 902 to other computing devices. Communication connection(s) 919 may include a wired connection or a wireless connection. Communication connection(s) 919 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 902 may include input device(s) 904 such as keyboard, mouse, pen, voice input device, touch input device, infrared cameras, video input devices, and/or any other input device. Output device(s) 912 such as one or more displays, speakers, printers, and/or any other output device may also be included in device 902. Input device(s) 914 and output device(s) 912 may be connected to device 902 via a wired connection, wireless connection, or any combination thereof. In one implementation, an input device or an output device from another computing device may be used as input device(s) 914 or output device(s) 912 for computing device 902.

Components of computing device 902 may be connected by various interconnects, such as a bus. Such interconnects may include a Peripheral Component Interconnect (PCI), such as PCI Express, a Universal Serial Bus (USB), firewire (IEEE 1364), an optical bus structure, a wireless bus structure, and the like. In another implementation, components of computing device 902 may be interconnected by a network. For example, memory 908 may be comprised of multiple physical memory units located in different physical locations interconnected by a network.

Those skilled in the art will realize that storage devices utilized to store computer readable instructions may be distributed across a network. For example, a computing device 920 accessible via network 918 may store computer readable instructions to implement one or more implementations provided herein. Computing device 902 may access computing device 920 and download a part or all of the computer readable instructions for execution. Alternatively, computing device 902 may download pieces of the computer readable instructions, as needed, or some instructions may be executed at computing device 902 and some at computing device 920.

In one aspect, an automated profile detection technique and system may be implemented to automatically detect and store the pedal profile for different vehicles. In one implementation, in this aspect, a pedal sensor output signal measurement detector can be coupled with the accelerator pedal sensors of the accelerator pedal of a target vehicle. As one example, pedal sensor output signal measurement detector can comprise an electrical current or voltage detector, which detects a voltage or electrical current characteristic reading from the sensor(s). Further, in this implementation, a pedal profiling measurement procedure can be initialized, and an operator can move the target vehicle's accelerator pedal from a fully released position (e.g., not depressed) to a fully depressed position (e.g., step one). In this implementation, the accelerator pedal can subsequently be fully released back to the initial position (e.g., step two). In this example, during the sequence of depressing and releasing the pedal, the sensor profiles and/or correlation can be determined. In another implementation, the two step sequence could be performed in reverse.

In this example, during the first step of the automated pedal profile detection sequence, a high and low sensor output signal value (e.g., the maximum and minimum values) of the sensor profiles can be are determined and recorded. Further, in this example, at the beginning of the second step a master sensor can be selected from the one or more pedal position sensors present for the target vehicle's accelerator pedal. In this example, the master sensor may be selected and assumed to have a linear sensor signal output (e.g., voltage) profile, that is plotted across the pedal movement range from 0-100% at a fixed resolution (e.g. 0%, 10%, 20% . . . 100%).

Additionally, during the second step, while the pedal is being released the signal output of the secondary sensors (e.g., other than the selected master) can be detected and recorded at each of the fixed resolution, predetermined positions (e.g., dependent on the chosen resolution). Selecting of the master sensor over the secondary sensors, and creating a linear profile, can be performed in order to determine a correlation of pedal position for the multiple sensors. In this way, for example, an appropriate correlation between the multiple sensors can be identified.

In one implementation, the automated profile detection and recording method measures and records sensor output values over their output range in relation to the position of the pedal, and also records the correlation/relationship between the respective pedal sensors across their non-linear movement range. In this implementation, the detecting and recording of the appropriate correlation data between respective sensors in the pedal position system of a target vehicle can mitigate ECU errors for the target vehicle. That is, for example, the ECU for the target vehicle may be programmed to receive particular sensor data from the pedal position sensor system of the vehicle, where the particular sensor data comprises expected sensor signal for related pedal positions. In this example, The ECU can be configured to output an error signal when unexpected or corrupted sensor signal data is received from the position sensor system of the vehicle (e.g., caused by damaged or inoperable sensors). As one example, when the ECU detects anomalous readings the error signal output may set off a sequence of events in the vehicle to place it into a safe mode for the vehicle's operator. As an example, during a safe mode the vehicle may be limited to a "limp" speed to allow the operator to move the vehicle to a safe location for further diagnostics and/or repair in case the anomalous reading would impact the safety of the vehicle's operation.

In one implementation, the profiling sequence may also include a verification step. For example, the target vehicle can comprise an On-Board Diagnostics port (OBD port), which is a connection port in the vehicle that can be connected to a reader/scanner, to provide a self-diagnostic and reporting ability for the vehicle. The OBD port may enable an operator to access information relating to the health state of various vehicle sub-systems, and/or sensor readings. In this implementation, the high and low output signal of the pedal position sensor(s) may be verified using the target vehicle's ODB port. As an example, the readings from the verification step can be compared to the detected and recorded sensor signal outputs during the automated sensor profile detection, to verify (e.g., within an acceptable threshold of variance) that the detected signal outputs from the automated step are correct. As an example, if the detected values do not match (e.g., within the acceptable threshold) the verification step's readings, the profiling sequence can be rerun, at least until the detected sensor outputs are appropriately verified.

In one implementation, the recorded pedal position sensor profile data can be used to emulate (e.g., replace) the output signals from the accelerator position system of a target vehicle. As an example, as described above, the pedal position sensor profile data may be used in a speed limiting system that limits the vehicle's speed regardless of the position of the accelerator pedal. In this implementation, the correlated data between respective sensors in the pedal position system of a target vehicle can help to provide the appropriate emulated output signal data to the ECU, thereby mitigating the ECU errors. Further, the verification step may also help to provide sensor signal out data for the pedal position profile that is appropriate for the target vehicle, and also helps to mitigate potential ECU errors. In this implementation, for example, the speed limiting system may emulate the pedal position sensors' output signal using the automatically created pedal position sensor profile, and the emulated output signal may be less likely to result in an ECU error that could limits the vehicle operator's ability to operate the vehicle in a desired manner.

In one implementation, the output signal from the one or more accelerator pedal position sensors can comprise a voltage. In this implementation, a voltage detector can be connected to the sensor output(s) to detect the voltage value output from the sensor(s) at various pedal positions. Further, a voltage value recordation component (e.g., a computer-based program configured to record sensor output) can be communicatively coupled with the voltage detector. In this exemplary implementation, the voltage value recordation component can record the detected voltage values during the automatic profile detection steps, as described herein. Additionally, where the target vehicle comprises more than one accelerator pedal position sensor (APS), such as a first APS (APS1) and a second APS (APS2), one of the APSs can be selected as a master sensor. As an example, the APS1 sensor can be selected as the master sensor, and the recorded output voltage signal of the APS1 sensor can be correlated to the respective pedal positions in a linear manner (e.g., a graphically linear relationship between the two values of position and voltage).

As one example, the position of the pedal may be identified by its angle of disposition with regard to the floor of the vehicle. That is, for example, the angle of opening between the accelerator pedal and the floor can be expressed as a degree of angle, such as from zero degrees to ninety degrees (e.g., or some other appropriate range dependent of the vehicle), such as measured by a protractor, a digital angle finder, or some other measurement tool. In this example, the two values (e.g., X, Y) for the pedal position profile may comprise the pedal's position, expressed as an angle, and the pedal position sensor output signal, expressed as a voltage value. As another example, the position of the pedal may be identified by a percentage of closure (e.g., depression) from a fully open position (e.g., fully released ~0%) to a fully closed position (e.g., fully depressed ~100%). In this example, the two values (e.g., X, Y) for the pedal position profile may comprise the pedal's position, expressed as percentage of closure, and the pedal position sensor output signal, expressed as a voltage value, such as measured by a template, ruler, digital measurement device, laser measurer, etc.

As described above, in one implementation, the relationship between a first value (e.g., X—pedal position) and a second value (e.g., Y—APS output) for the master sensor (e.g., APS1) can be expressed as a linear relationship. Further, the relationship between a first value (e.g., X—pedal position) and a second value (e.g., Y—APS output) for the respective other sensor (e.g., APS2) can be expressed as a curve function relationship (e.g., which also may be linear), based at least upon the positions identified in the linear relationship of the master sensor values.

Figure 10:
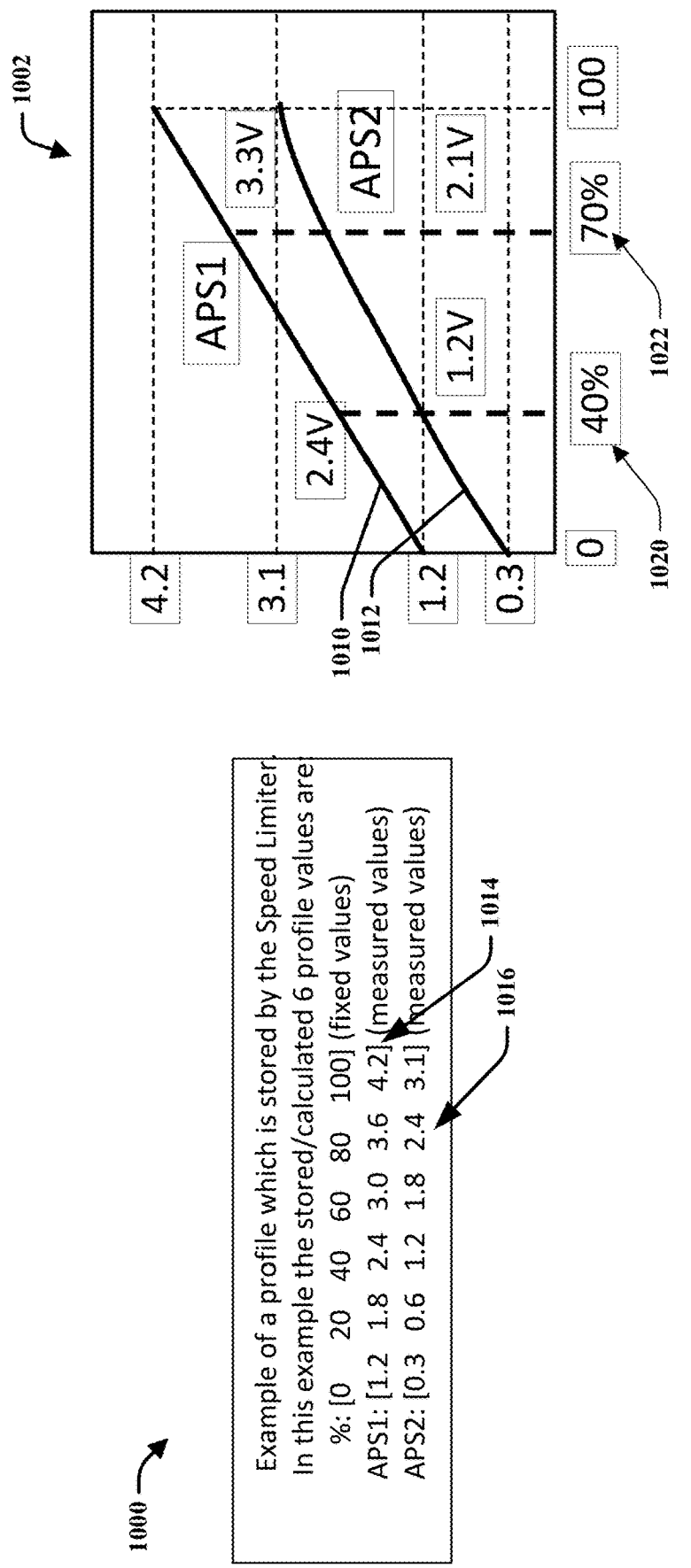
FIG. 10 is an exemplary table and graphs illustrating one or more of the provisions set forth herein.

As an illustrative example, FIG. 10 is a table 1000 and graphical representation 1002 of an example implementation of the accelerator pedal position profile, for two APSs. In this example, a pedal position profile for APS1 1010 and for APS2 1012 are illustrated in graph 1002. As shown in table 1000, the pedal position profiles for APS1 1010 and APS2 1012 can be created from the respective values 1014, 1016 shown for the corresponding sensor readings for APS1 and APS2. In this example, sensor APS1, and the accompanying profile 1010, may be considered the master sensor, as described above, and APS2, and the accompanying profile 1012, may be considered to be the secondary sensor. As illustrated in the graph 1002, the APS1 profile 1010 comprises a linear representation (e.g., relationship), and the APS2 profile 1012 comprises a curve.

Further, as illustrated, the graph 1002 illustrates voltages determined during the automated profile generation process. In one example, a speed limiter may utilize the profiles 1010, 1012 of APS1 and APS2 respectively, in one instance of pedal/vehicle operation. In this example, as illustrated by the forty-percent line 1020, the values of 2.4V and 1.2 for the APS1 profile 1010 and the APS2 profile 1012 respectively correlate with a pedal position value of 40% when interpolating the values in the stored profile table 1000. Additionally, in this example, the seventy-percent line 1022 illustrates measured voltages by the speed limiter from sensors APS1 and APS2 respectively, in another instance of pedal/vehicle operation. In this example, the values of 3.3V and 2.1V for the APS1 profile 1010 and the APS2 profile 1012 respectively correlate with a pedal position value of 70% when interpolating the values in the stored profile table 1000.

Of note, that the above example uses potentially ideal values, and assumes that a linkage between APS1 and APS2 is appropriately fixed. However, in a real world operation of the speed limiter, and/or the APSs, the measured voltages of APS1 and APS2 may not correlate to identical values within a corresponding profile table, and there some degree of error between the correlated values of APS1 and APS2. In one implementation, a threshold error value may be utilized, which, if the values remain within the threshold, the resulting values may be utilized as an output signal. However, in this implementation, if large difference is measured (e.g. >20%), which falls outside the error threshold, it may be assumed that there is an issue with the readings, and/or with the accelerator pedal, or sensors. In this case, the sensor output may not be used, and/or an ECU error may be propagated.

In this example, the speed limiter can output a signal (e.g., voltage(s)) that emulates the correlation between the APS1 and APS2 sensors in the actual accelerator pedal. This would apply to both non-limited operation of the vehicle, and speed limiting operation of the vehicle, because the accelerator pedal is bypassed by the speed limiter. In example illustrated in FIG. 10, based on the speed limiter operation, the output signal should correspond to correct voltages emulating a pedal position value of 70%. In this example, the seventy-percent line 1022 shows the voltages that can be calculated by the speed limiter for APS1 and APS2 respectively, when looking-up the voltage values in the speed limiter table 1000 for a position of 70%.

Figure 11:
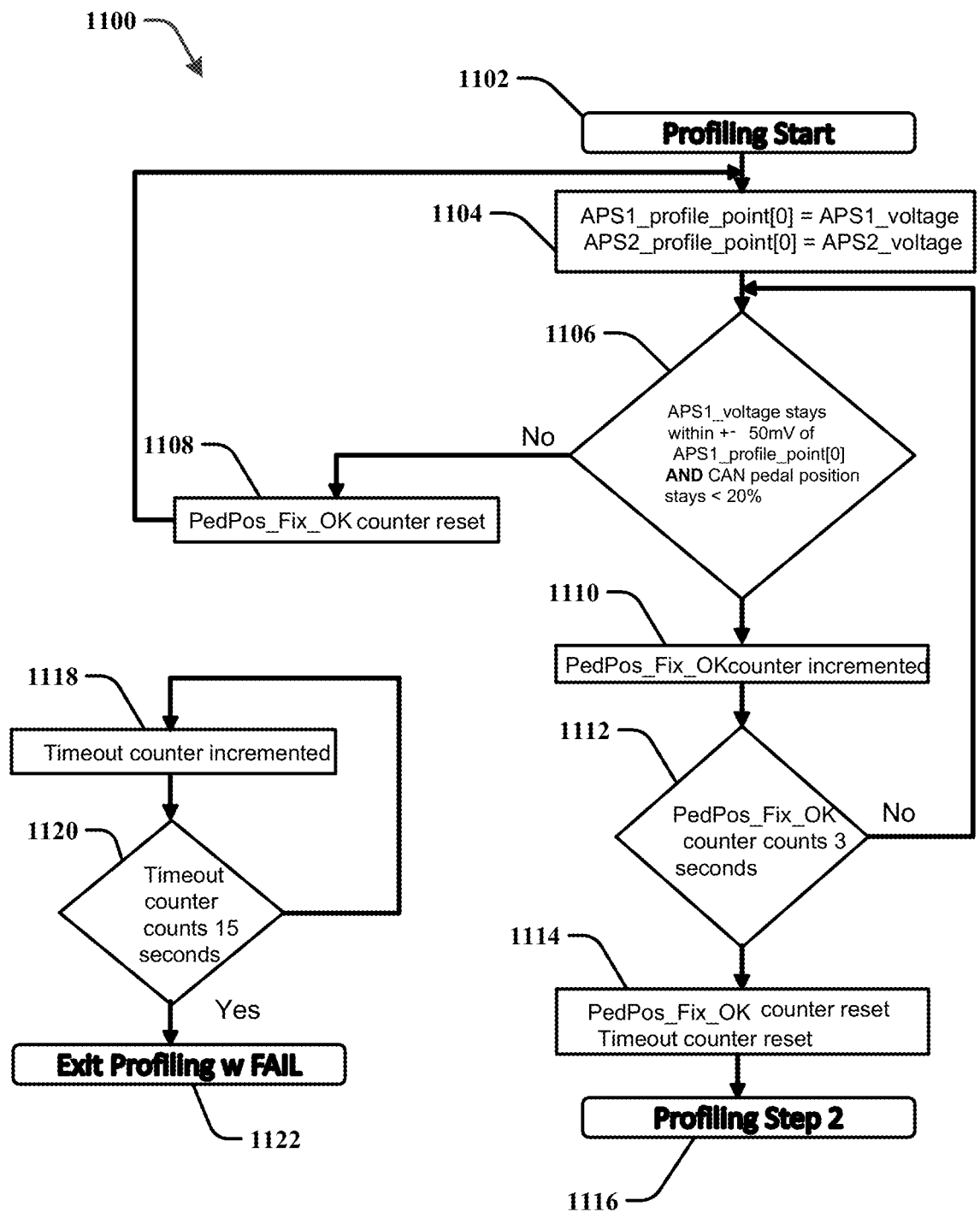
FIG. 11 is a flow diagram illustrating one or more portions of one or more methods described herein.
Figure 12:
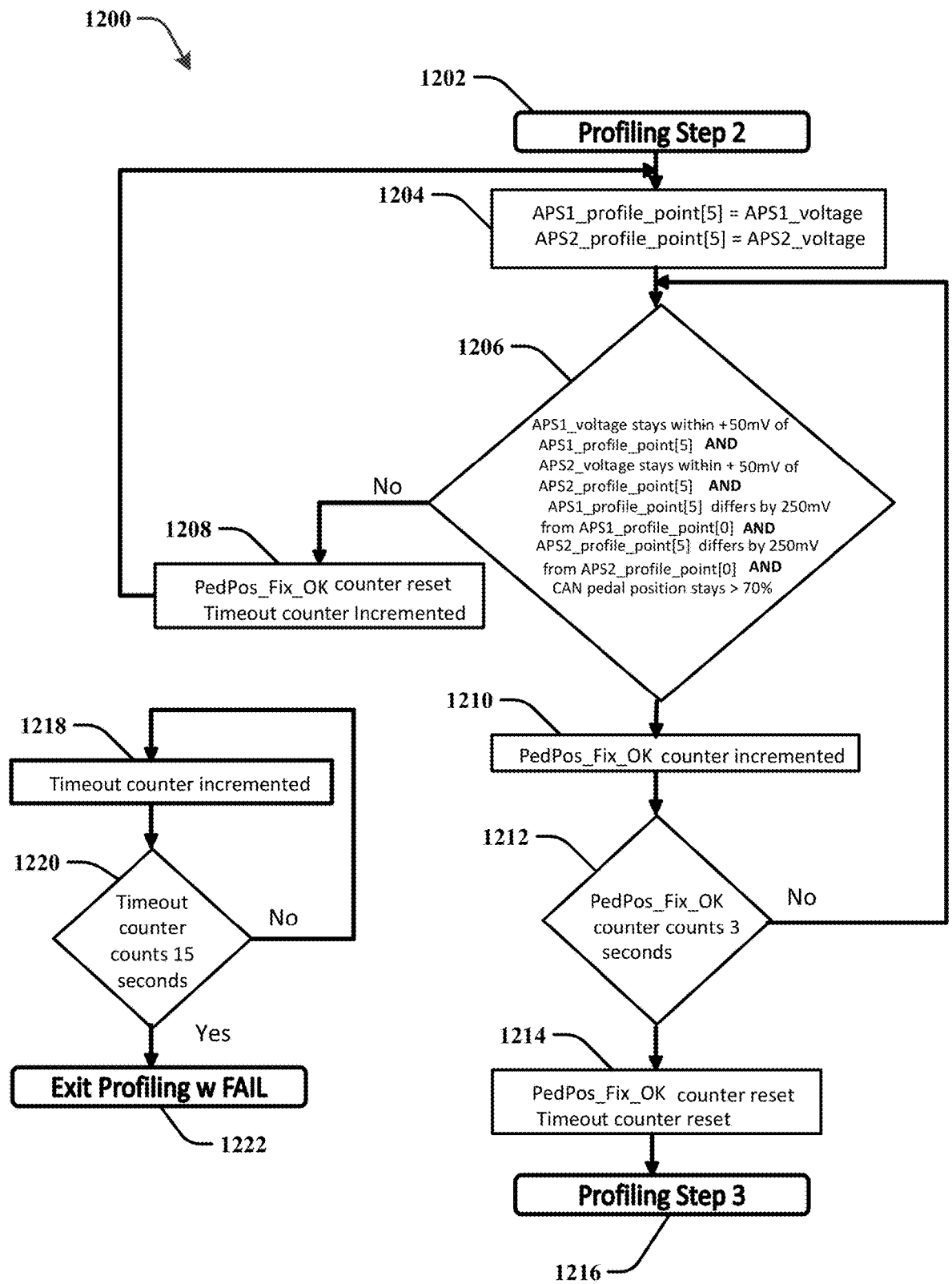
FIG. 12 is a flow diagram illustrating one or more portions of one or more methods described herein.
Figure 13:
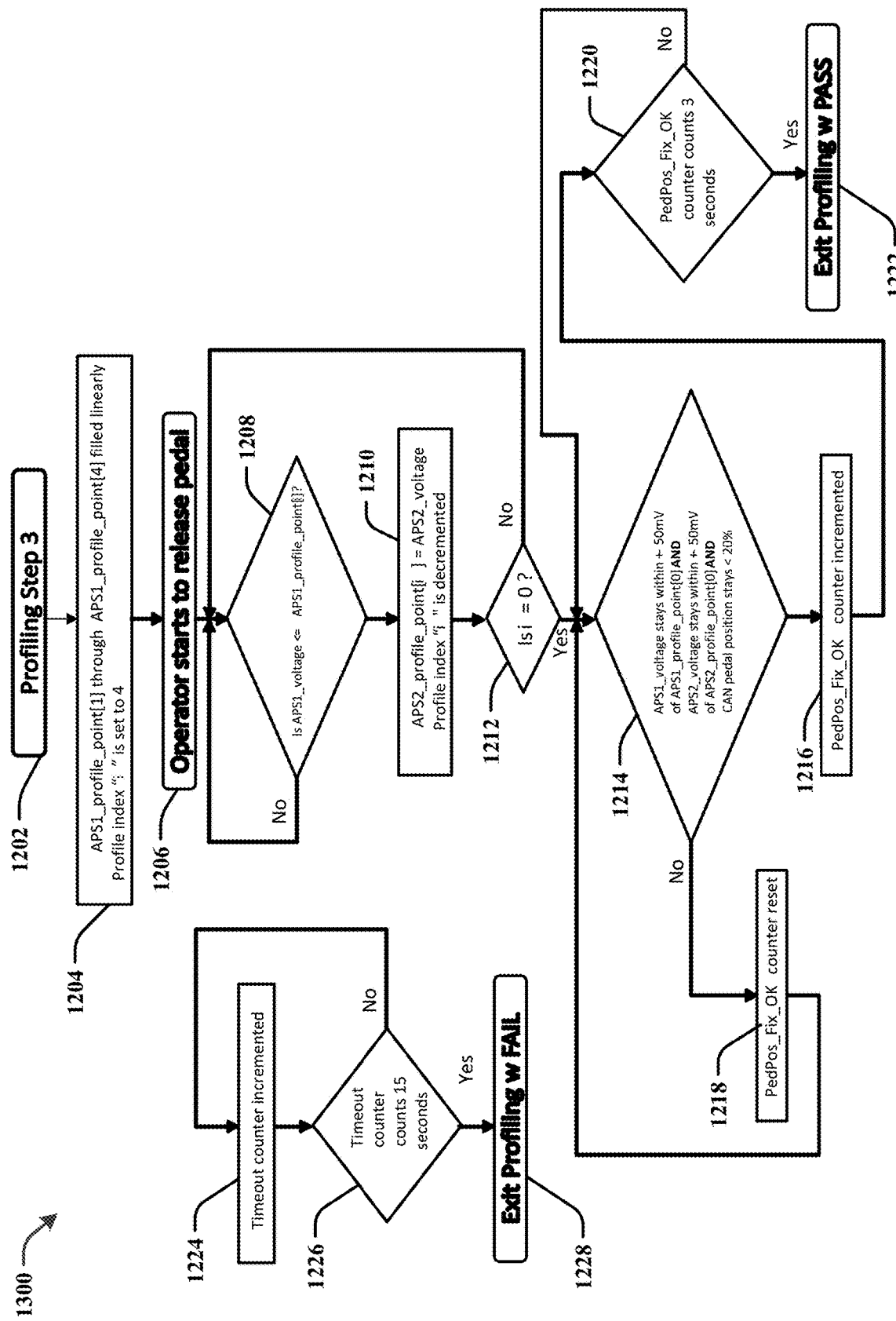
FIG. 13 is a flow diagram illustrating one or more portions of one or more methods described herein.

FIGS. 11, 12, and 13 are flow diagrams illustrating one or more portions of an example method for creating a pedal profile. The example method 1100 of FIG. 11 illustrates one implementation for a first step in an automated pedal profile creation process. The example process begins at 1102, for example, where the target accelerator pedal is disposed in a released position. At 1104, the voltage signal for the first sensor APS1 and the second sensor APS2 can be respectively read at a first position point (e.g., point zero). At 1106, it is determined whether the readings are within acceptable thresholds, for the expected position. If not, at 1108, the pedal position counter is reset and the profiling begins again at 1104. If the threshold is met, the pedal position counter is incremented at 1110. At 1112, it is determined whether the pedal is disposed in a fixed position (e.g., not depressed). If not, at 1106, the process is iterated to identify the voltage signal and determine if the threshold is met. If the pedal has remains in a fixed position, at 1114, the pedal position is reset, and the timeout counter is reset. If the timeout counter is incremented, at 1118, and it is determined that the counter reaches 15 seconds, at 1120, the profiling fails at 1122 and the process 1100 is exited. Alternately, once the position is reset and timeout counter reset at 1114, the profile process moves to step two at 1116.

The example method 1200 of FIG. 12 illustrates one implementation for a second step in an automated pedal profile creation process. The example process begins at 1202, for example, where the target accelerator pedal is depressed, such as by an operator. At 1204 the voltage signal for respective pedal position sensors (e.g., APS1 and APS2) is identified. At 1206, it is determined whether the identified signals are within an acceptable threshold range. If not, at 1208, the pedal position counter is reset and the timeout counter incremented, and the process moves back to the beginning to identify the voltage signal. If the sensor signals meet the proposed threshold, the pedal position counter is reset at 1210. At 1212, it is determined whether the pedal position is depressed for 3 seconds. If not, at 1206, the process is iterated to identify the voltage signal and determine if the threshold is met. If the pedal is being depressed, at 1214, the pedal position is reset, and the timeout counter is reset. If the timeout counter is incremented, at 1218, and it is determined that the counter reaches 15 seconds, at 1220, the profiling fails at 1222 and the process 1200 is exited. Alternately, once the position is reset and timeout counter reset at 1214, the profile process moves to step three at 1216.

The example method 1300 of FIG. 13 illustrates one implementation for a third step in an automated pedal profile creation process. The example process begins at 1302. At 1204, the first sensor is selected as the mater sensor, and the respective points of signal recordation are filled in a linear manned in the pedal profile. At 1206, the operator releases the pedal. At 1208, it is determined whether the APS1 signal is less than or equal to the APS1 profile point in the recorded pedal profile. If not, the process is rerun at 1206. If it is, then the profile point "I" for the second sensor, APS2, is decremented, at 1210. At 1212 it is determined whether the profile point "I" for the second sensor, APS2 is equal to zero. IF not, the process is rerun at 1206. If it is determined whether the respective sensor signals are within the desired threshold range, at 1214. If not, at 1218, the pedal position sensor counter is reset, and the process iterated. If they meet the threshold, at 1216, the pedal position counter is incremented. Once it is determined that the pedal position has reached a fixed position (e.g., released), at 1220, the profiling process ends at 1222. If the pedal is not fixed, the process iterates again until the pedal reaches the end position. During the process 1300, the timeout counter can be reset, at 1224. If the timeout counter reaches 15 seconds, at 1226, the profiling process is failed, and exits at 1228.

Various operations of implementations are provided herein. In one implementation, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each implementation provided herein.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. A method for creating a pedal profile for a target vehicle, comprising:
   initializing a pedal profile detection procedure;
   depressing the accelerator pedal from a fully released position to a fully depressed position;
   releasing the accelerator pedal back to the initial fully released position;
   automatically detecting an output signal from one or more pedal position sensors for an accelerator pedal in a target vehicle when the accelerator pedal is disposed in a released position using a pedal position sensor reader;
   automatically detecting an output signal from the one or more pedal position sensors for the accelerator pedal in the target vehicle while the accelerator pedal is moving between the released position and a depressed position using the pedal position sensor reader;
   automatically detecting an output signal from the one or more pedal position sensors for the accelerator pedal in the target vehicle when the accelerator pedal is disposed in the depressed position using the pedal position sensor reader;
   selecting a master sensor from the one or more pedal position sensors and determining a linear relationship between a position of the accelerator pedal and the plurality of output signals for the master sensor using a processor, wherein the selecting is performed after the accelerator pedal is disposed in the depressed position, and prior to releasing the accelerator pedal back to the released position, resulting in remaining non-selected sensor(s) of the one or more pedal position sensors to be designated as a secondary sensor;
   generating a pedal position profile for the accelerator pedal based on the linear relationship of the master sensor using the processor, the pedal position profile comprising an output signal corresponding to respective pedal positions for the accelerator pedal; and
   storing the pedal position profile in memory.

2. The method of claim 1, detecting an output signal from one or more pedal position sensors using pedal position sensor reader comprising using a voltage detector to detect the output signal.

3. The method of claim 2, comprising connecting the voltage detector to appropriate sensor outputs for the one or more pedal position sensors.

4. The method of claim 2, comprising coupling a voltage recordation component to the voltage detector to record respective detected output signals.

5. The method of claim 1, comprising detecting and recording a high value and a low value for the output signal from the one or more pedal position sensors during the moving of the accelerator pedal from the released position to the depressed position.

6. The method of claim 5, comprising performing a verification of the high value and the low value in the pedal position profile for a target vehicle, comprising comparing a reading from the target vehicle with the pedal position profile generated for the target vehicle, and determining that the comparison is within a predetermined threshold of variance.

7. A method of claim 1, comprising aligning the plurality of output signals from the master sensors in a linear relationship with respective pedal positons.

8. A method of claim 1, comprising detecting an output signal from one or more of the secondary sensors and recording the detected signal while the accelerator pedal is moving from the depressed position to the released position.

9. The method of claim 8, comprising creating a correlation relationship between the output signal of the master sensor and the one or more secondary sensors at respective positions between the released position and the depressed position.

10. The method of claim 8, comprising creating a curve function relationship between the output signal and pedal position for the one or more secondary sensors.

11. The method of claim 1, detecting an output signal from the one or more pedal position sensors for the accelerator pedal in the target vehicle while the accelerator pedal is moving between the released position and the depressed position comprising recording a reading of the output signal at each of a plurality of predetermined positions between the released position and a depressed position.

12. The method of claim 11, comprising measuring the predetermined position of the one or more pedal position sensors by determining one or more of:
   an angle of disposition of the accelerator pedal in relation to a floor of the target vehicle; and
   a percentage of closure of the accelerator pedal between fully open and fully closed.

13. The method of claim 1, comprising performing error detection during use of the pedal position profile in a speed limiter device in target vehicle, comprising comparing one or more signal output values from the speed limiter device to corresponding signal output values from the one or more pedal position sensors in the target vehicle, and merely utilizing the signal output values from the speed limiter that are within a predetermined threshold fora use variance.

14. A system for automatically generating a pedal profile for a target vehicle, comprising:
   a signal detector communicatively coupled with one or more pedal position sensors in a target vehicle to automatically detect an output signal from the one or more pedal positions sensors when:
  an accelerator pedal in the target vehicle is disposed in a released position;
  the accelerator pedal in the target vehicle is moving between the released position and a depressed position;
  the accelerator pedal is disposed in the depressed position; and
  the accelerator pedal is moving between the depressed position and the released position;
a processor that:
  automatically selects a master sensor from the one or more pedal positions sensors after the accelerator pedal reaches the depressed position;
  automatically generates a linear function relationship between the output signals from the master sensor and a corresponding accelerator pedal position; and
  automatically generates a pedal profile for the accelerator pedal based on the linear function relationship of the master sensor, the pedal profile comprising an output signal corresponding to respective pedal positions for the accelerator pedal; and
memory that stores the pedal profile for the target vehicle.

15. The system of claim 14, the signal detector comprising a voltage detector that identifies a voltage output by respective pedal positions sensors at respective positions of the accelerator pedal.

16. The system of claim 14, comprising a pedal position measuring device that determines one or more of:
  an angle of disposition of the accelerator pedal in relation to a floor of the target vehicle; and
  a percentage of closure of the accelerator pedal between fully open and fully closed.

17. The system of claim 14, comprising a verification component that utilizes the processor to compare a reading from the target vehicle with the pedal profile generated for the target vehicle, and determining that the comparison is within a predetermined threshold of variance.

18. A method for creating a pedal profile for a target vehicle, comprising:
  automatically detecting an output signal from one or more pedal position sensors for an accelerator pedal in a target vehicle when the accelerator pedal is disposed in a released position using a voltage detector to identify a voltage reading for respective pedal positions measured;
  automatically detecting an output signal from the one or more pedal position sensors for the accelerator pedal in the target vehicle at predetermined pedal positions while the accelerator pedal is moving between the released position and a depressed position using the voltage detector;
  automatically detecting an output signal from the one or more pedal position sensors for the accelerator pedal in the target vehicle when the accelerator pedal is disposed in the depressed position using the voltage detector;
  selecting a master sensor from the one or more pedal position sensors after the accelerator pedal is placed in the depressed position, and determining a linear relationship between each of the predetermined pedal positions and an output signals corresponding to the predetermined pedal position for the master sensor using a processor, resulting in any non-master sensors selected as a secondary sensor;
  automatically detecting an output signal from respective secondary sensors while the accelerator pedal is moving from the depressed position to the released position, and creating a curve function relationship between the output signal and respective predetermined pedal positions for the each secondary sensor;
  generating a pedal position profile for the accelerator pedal based on the linear relationship of the master sensor and the curve function relationship of the secondary sensor(s), if present, using the processor, the pedal position profile comprising an output signal corresponding to pedal positions for the accelerator pedal; and
  storing the pedal position profile in memory.

* * * * *